(12) United States Patent
Singh et al.

(10) Patent No.: US 12,505,609 B2
(45) Date of Patent: Dec. 23, 2025

(54) SYSTEMS AND METHODS TO GENERATE AN INTERACTIVE ENVIRONMENT USING A 3D MODEL AND CUBE MAPS

(71) Applicant: Obsess, Inc., New York, NY (US)

(72) Inventors: Neha Singh, New York, NY (US); Hiran Gnanapragasam, New York, NY (US); Yashodhan Kumthekar, New York, NY (US); Michael Tu, Jersey City, NJ (US)

(73) Assignee: Obsess, Inc., New York, NY (US)

( * ) Notice: Subject to any disclaimer, the term of this patent is extended or adjusted under 35 U.S.C. 154(b) by 701 days.

(21) Appl. No.: 17/719,976

(22) Filed: Apr. 13, 2022

(65) Prior Publication Data

US 2022/0245888 A1    Aug. 4, 2022

Related U.S. Application Data

(63) Continuation-in-part of application No. 16/821,044, filed on Mar. 17, 2020, now Pat. No. 11,348,315.
(Continued)

(51) Int. Cl.
*G06T 15/20* (2011.01)
*G06Q 30/0601* (2023.01)
*G06T 13/00* (2011.01)

(52) U.S. Cl.
CPC ......... *G06T 15/20* (2013.01); *G06Q 30/0643* (2013.01); *G06T 13/00* (2013.01)

(58) Field of Classification Search
None
See application file for complete search history.

(56) References Cited

U.S. PATENT DOCUMENTS 10,706,624 B1    7/2020  Chuah et al.
10,733,638 B1 *  8/2020  Jain ..................... G06F 16/9574
(Continued)

FOREIGN PATENT DOCUMENTS

CN    112465696 A  *  3/2021  .......... G06T 3/4038

OTHER PUBLICATIONS

Zhang, CN-104484896-A, Apr. 1, 2015 (Year: 2015).*
(Continued)

*Primary Examiner* — Kee M Tung
(74) *Attorney, Agent, or Firm* — BROOKS KUSHMAN P.C.

(57) ABSTRACT

Systems and methods include a virtual environment generator to create an interactive virtual environment based on one or more cube maps. The virtual environment generator derives the cube maps from a computer-generated 3D model to correspond to viewpoints in the computer-generated 3D model. The cube maps represent static images and the virtual environment generator further layers various features and virtual items onto the cube maps to create the interactive virtual environment with both static and dynamic portions. One or more mapping locators are generated and layered onto the cube maps. Interactive layers, product models, animation layers, and virtual items, such as virtual characters and environment objects, are layered onto the cube map (e.g., via associations with the mapping locators). Interactions at the interactive layer can cause product information to be displayed. In a friend mode, multiple user devices can simultaneously present and/or interact with the cube map together.

14 Claims, 14 Drawing Sheets

Related U.S. Application Data

(60) Provisional application No. 63/276,389, filed on Nov. 5, 2021, provisional application No. 62/820,540, filed on Mar. 19, 2019.

(56) References Cited

U.S. PATENT DOCUMENTS

| | | | |
|---|---|---|---|
| 10,740,957 B1* | 8/2020 | McElroy | A63F 13/355 |
| 2004/0113818 A1 | 6/2004 | Yokokohji et al. | |
| 2005/0253840 A1 | 11/2005 | Kwon | |
| 2014/0095349 A1* | 4/2014 | Mabrey | G06Q 50/01 705/26.8 |
| 2016/0202947 A1* | 7/2016 | Ramalingam | G06F 1/163 345/2.2 |
| 2017/0061838 A1 | 3/2017 | Shi et al. | |
| 2017/0078654 A1 | 3/2017 | Facin et al. | |
| 2017/0186232 A1 | 6/2017 | Dange | |
| 2017/0301132 A1 | 10/2017 | Dalton et al. | |
| 2017/0374344 A1 | 12/2017 | Boulton et al. | |
| 2018/0240276 A1 | 8/2018 | He et al. | |
| 2018/0300782 A1* | 10/2018 | Hwang | G06Q 20/12 |
| 2018/0374276 A1* | 12/2018 | Powers | G06T 17/205 |
| 2019/0057487 A1 | 2/2019 | Cheng | |
| 2019/0197599 A1* | 6/2019 | Zia | G06Q 30/0631 |
| 2019/0215532 A1* | 7/2019 | He | H04N 13/383 |
| 2019/0238819 A1* | 8/2019 | Furukawa | G06T 19/00 |
| 2019/0378341 A1 | 12/2019 | Xie et al. | |
| 2019/0394443 A1* | 12/2019 | Schickel | H04N 13/122 |
| 2020/0160488 A1 | 5/2020 | Van Deventer et al. | |
| 2020/0298113 A1* | 9/2020 | Smithers | G06T 19/20 |

OTHER PUBLICATIONS

Jiang, CN-108132712-A, Jun. 8, 2018 (Year: 2018).*
Speicher, Marco, Sebastian Cucerca, and Antonio Kruger. "VRShop: a mobile interactive virtual reality shopping environment combining the benefits of on-and offline shopping." Proceedings of the ACM on Interactive, Mobile, Wearable and Ubiquitous Technologies 1, No. 3 (Sep. 11, 2017): 1-31. (Year: 2017).

* cited by examiner

SYSTEMS AND METHODS TO GENERATE AN INTERACTIVE ENVIRONMENT USING A 3D MODEL AND CUBE MAPS

CROSS-REFERENCE TO RELATED APPLICATIONS

The present application is a continuation-in-part of U.S. patent application Ser. No. 16/821,044 filed on Mar. 17, 2020, which claims the benefit of U.S. Provisional Patent Application No. 62/820,540 filed on Mar. 19, 2019. The present application further claims priority under 35 U.S.C. § 119 to U.S. Provisional Application No. 63/276,389, filed on Nov. 5, 2021. Each of these applications is specifically incorporated by reference herein in its entirety.

FIELD

Aspects of the presently disclosed technology relate generally to systems and methods for generating interactive three-dimensional virtual environments for product interaction and virtual experience and more particularly to an interactive environment using three-dimensional modeling and cube mapping.

BACKGROUND

As ecommerce websites continue to grow in popularity and replace traditional brick-and-mortar retail establishments, retailers have various online distribution options. Retailers can build their own virtual store on their own website, or they can use a large-scale, third-party ecommerce site which aggregates product information from many different retailers and presents the product information as a list of product icons.

Many retailers would like to present their own, custom, virtual store on their own site. However, engaging virtual environments with sophisticated browsing and shopping features are difficult to build. Cost constraints can prevent many retailers from investing in developing their own virtual stores in-house. These virtual stores typically use a scrollable list of images and drop-down browsing structure with little focus on recreating the nuances of a brick-and-mortar shopping experience. Furthermore, some types of products are not as suitable for online shopping as others. These products may rely on a particular shopping experience or style of browsing that is lacking from ecommerce sites. Clothing retailers may find it difficult to sell clothes via ecommerce sites because browsing products virtually is a significantly different and less engaging experience than perusing nicely curated rooms of a brick-and-mortar clothes retailer.

It is with these observations in mind, among others, that various aspects of the present disclosure were conceived and developed.

SUMMARY

Implementations described and claimed herein address the foregoing problems by providing systems and methods for generating an interactive virtual environment. In some examples, a method to provide a virtual interactive environment comprises: receiving a computer-generated three-dimensional (3D) model representing a virtual 3D space; converting the computer-generated 3D model into a plurality of cube maps corresponding to a plurality of viewpoints in the virtual 3D space, the plurality of viewpoints creating an incremental path in the virtual 3D space; generating, at a viewpoint of the plurality of viewpoints, a mapping plane or a mapping point associated with coordinates in the virtual 3D space; mapping one or more product models to the mapping plane or the mapping point; generating an interactive plane for the one or more product models, the interactive plane being associated with product information related to the one or more product models such that an interaction with the interactive plane causes retrieval of the product information; and presenting, at a display, the virtual interactive environment as a scene from the viewpoint, the scene being defined by a cube map of the plurality of cube maps corresponding to the viewpoint, the one or more product models being visible in the scene, and the interactive plane being at least partly layered over the one or more product models in the scene.

In some examples, the scene is a first scene and the viewpoint is a first viewpoint, and the method further comprises presenting, at the display, one or more navigation arrows which, upon receiving a user input, cause the display to present a second scene by traversing from the first viewpoint to a second viewpoint of the plurality of viewpoints. The cube map can include a plurality of (2D) cube side images; and presenting the virtual interactive environment can include rendering a front 2D cube side image of the plurality of 2D cube side images before rendering other 2D cube side images of the plurality of 2D cube side images. The virtual interactive environment can include a 2D video with a skew corresponding to a surface in the virtual 3D space. Additionally, the viewpoint can be a first viewpoint and the method can further comprise: receiving a first user input as a response to a prompt for preference information; receiving a second user input as the interaction with the interactive plane; and determining a second viewpoint to present at the display as a suggested viewpoint based on the response or the product information associated with the interactive plane.

In some instances, the computer-generated 3D model includes a virtual building; the virtual 3D space is an inside of the virtual building, the plurality of viewpoints include a plurality of rooms inside the virtual building; and the second viewpoint corresponds to a particular room of the plurality of rooms with an associated trait corresponding to the response or the product information. The one or more product models can include a first product image based on a 3D model file and a second product image based on a 2D image file. Moreover, the coordinates of the viewpoint can be based at least partly on a minimum distance value from a surface in the virtual 3D space. Additionally, generating the mapping plane can include defining a plurality of corner points for the mapping plane at a virtual surface in the virtual 3D space. The method can further comprise: mapping an animation layer to the mapping plane or the mapping point, the animation layer including a repeating color event or a moving object. Furthermore, the display can be a first display of a first computing device, the scene can be a first scene defined by a first cube map of the plurality of cube maps, and the method can further comprise: presenting the virtual interactive environment at a second display of a second computing device; receiving a navigation input at the first computing device; and presenting, in response to the navigation input at the first computing device, at the first computing device and at the second computing device, the virtual interactive environment as a second scene defined by a second cube map of the plurality of cube maps. This can be repeated for any number of computing devices, scenes viewpoints, navigation arrows, and/or navigation inputs In some examples, a method to provide a virtual interactive environment comprises: receiving a computer-generated three-dimensional (3D) model representing a virtual 3D space; converting the computer-generated 3D model into a plurality of cube maps corresponding to a plurality of viewpoints in the virtual 3D space, the plurality of viewpoints creating an incremental path in the virtual 3D space; generating, at a viewpoint of the plurality of viewpoints, a plurality of mapping locators; mapping a product model to a first mapping locator of the plurality of mapping locators; mapping an animation layer to a second mapping locator of the plurality of mapping locators; and presenting, at a display, the virtual interactive environment as a scene from the viewpoint, the scene being defined by a cube map of the plurality of cube maps, the product model being visible in the scene with the animation layer.

In some instances, the second mapping locator is a mapping plane or one or more mapping points and the animation layer occurs over a portion of the cube map defined by the mapping plane or the one or more mapping points. The animation layer can include one or more of: a water animation with a lighting effect across at least a portion of the mapping plane; or a twinkle animation with a changing brightness at coordinates of the one or more mapping points. The animation layer can include an object moving over the portion of the cube map. The plurality of mapping locators are placed in the virtual 3D space to provide a drag-and-drop placement for a product model in the virtual 3D space. Furthermore, the plurality of mapping locators include a 3D mapping box and generating the plurality of mapping locators can include defining boundaries or corners of the 3D mapping box.

In some examples, a method to provide a virtual interactive environment comprises: receiving a computer-generated three-dimensional (3D) model representing a virtual 3D space; converting the computer-generated 3D model into one or more cube maps corresponding to one or more viewpoints in the virtual 3D space; generating, at a viewpoint of the one or more viewpoints, a plurality of mapping locators; mapping a product model to a first mapping locator of the plurality of mapping locators; mapping a virtual character to a second mapping locator of the plurality of mapping locators; and receiving a navigation input corresponding to the viewpoint; presenting, at a display, the virtual interactive environment as a scene from the viewpoint, the scene being defined by a cube map of the one or more cube maps corresponding to the viewpoint; the product model being visible in the scene, and the virtual character performing an action in the scene.

In some instances, the method further comprises generating the virtual character by: receiving a 2D video with a dynamic color area including the virtual character and a static color area omitting the virtual character; and causing the static color area to be removed or transparent. Moreover, mapping the virtual character to the second mapping locator can include removing a portion of the dynamic color area, the portion being removed corresponding to a virtual structure of the virtual 3D space.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
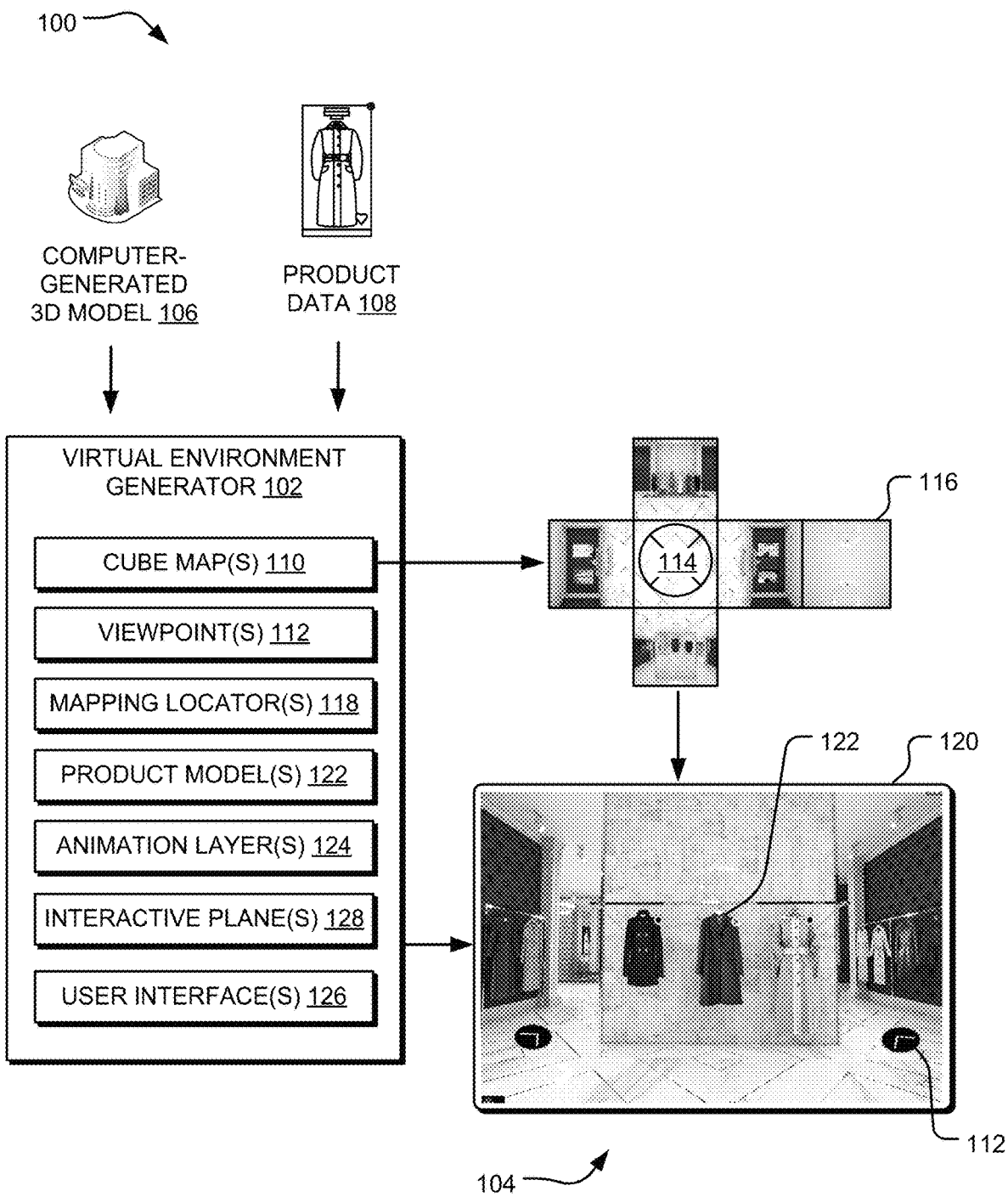
FIG. 1 illustrates an example system for generating a virtual interactive environment using one or more cube maps.

Aspects of the present disclosure involve systems and methods for generating a virtual interactive environment using cube maps derived from a 3D model. A virtual environment generator can receive the 3D model (e.g., a computer-generated imagery (CGI) 3D model), product information, and other data from various sources. Using the techniques discussed herein, the virtual environment generator seamlessly integrates the data into a high-resolution 3D environment that provides an engaging user experience.

The virtual environment generator can construct the virtual interactive environment by receiving the 3D model, determining which viewpoints in the 3D model make suitable or interesting scenes for the virtual interactive environment, and generating a plurality of cube maps corresponding to the viewpoints. The cube maps can be flattened into static images, and the virtual environment generator can further layer various other dynamic features and virtual items onto the cube maps to create the interactive virtual environment with both static portions and dynamic portions. For instance, one or more mapping locators (e.g., mapping points, 2D mapping planes, 3D mapping shapes, and the like) can be generated and layered onto the cube maps. Interactive layers (e.g., to trigger functions in response to user input), product models, animation layers, and virtual items, such as virtual characters and environment objects, can be layered onto the cube map, for instance, by mapping these features to the mapping locators. Multiple different resolutions of the cube maps can be stored and rendered in various rendering sequences to optimize performance of the interactive virtual environment.

Furthermore, the interactive virtual environment can include navigation indicators for traversing an incremental path formed by the viewpoints. One or more prompts can be presented to receive user inputs from which a user preference can be determined. The user preference can be used to determine a suggested scene or room of high interest to the user, and a suggested navigation indicator can be presented to transport the user to the suggested scene or room.

Moreover, a friend service can present the interactive virtual environment to multiple user devices simultaneously while facilitating a video conference to provide a shared interactive experience. The friend service can include screen sharing, multi-casting, messaging services, and various other services to provide a friend services utilizing the ability to share information about the interactive session between the multiple devices. This service can be used by celebrities, influencers, personal stylists, friend groups, families, or anyone with an audience to view or share the shopping experience.

These techniques for generating the interactive virtual environment can result in many benefits and advantages. For instance, any type of 3D model can be used for generating the cube maps, creating versatility, flexibility, and variety for the different interactive virtual environments that can be generated. Moreover, the virtual environment generator can integrate with multiple different types of merchant platforms (e.g., via an API integration process) to provide updated product information in the virtual environment, for instance, on a daily basis. As such, the virtual environment can sit on any type of site and integrate with any platform to provide an accurate depiction of the product offerings for the merchant in a more engaging environment than typical ecommerce sites. Additionally, the interactive virtual environment can be accessible by any type of user device (e.g., by accessing a web portal presenting a guest user interface).

These techniques increase the efficiency of data storage and retrieval processes to create the virtual interactive environment, reduce the lag time for rendering the virtual interactive environment, and maintain a high resolution. Moreover, the dynamic layers and interactive functions make a more immersive and enjoyable user experience, which can better recreate brick-and-mortar characteristics (e.g., nicely curated rooms, an enjoyable browsing experience, spontaneous product discovery, sharing the browsing experience with friends, etc.). Additional advantages will become apparent from the disclosure herein.

FIG. 1 illustrates an example system 100 including a virtual environment generator 102 to create a virtual interactive environment 104. The virtual environment generator 102 can be one or more software applications which receive multiple, different types of data and convert the data into the virtual interactive environment 104 perusable by a user or guest. The virtual environment generator 102 can generate the virtual interactive environment 104 using a computer-generated 3D model 106 (which can be any type of 3D model) and product data 108 corresponding to any type of product.

In some examples, the computer-generated 3D model 106 represents a virtual 3D space, such as an interior of a building. The computer-generated 3D model 106 can be any type of 3D model data type, such as a primitive model, a polygon model, a rational B-Spline model, a Non-Uniform Rational Basis Spline (NURBS) model, a Computer Aided Design (CAD) model, a solid model, a wireframe model, a surface model, combinations thereof, and the like. Moreover, other types of representations of virtual space and/or representations of real physical places can be used (e.g., videos, images, 360 video, panoramic video or images, etc.). Upon receiving (e.g., from a third-party such as a merchant) or generating the computer-generated 3D model 106, the virtual environment generator 102 can convert the computer-generated 3D model 106 into a plurality of cube maps 110 corresponding to a plurality of viewpoints 112. For instance, the virtual environment generator 102 can determine a viewpoint 114 of the plurality of viewpoints 112 as a particular location within the computer-generated 3D model 106 (e.g., corresponding to x, y, z, coordinates in the computer-generated 3D model 106). From the viewpoint 114, the virtual environment generator 102 can generate the cube map 110 by generating a plurality of 2D cube side images 116. The plurality of 2D cube side images 116 can include six 2D cube side images 116 such as a front 2D cube side image, a left 2D cube side image, a right 2D cube side image, a rear 2D cube side image, a top 2D cube side image, and a bottom 2D cube side image. These 2D cube side images 116 can be generated by the virtual environment generator 102 corresponding to the particular viewpoint 114. The virtual environment generator 102 can store the cube maps 110 as the plurality of 2D cube side images 116 with the association to the viewpoint 114. The virtual environment generator 102 can generate multiple cube maps 110 to correspond to the different viewpoints 112, such that navigating between the viewpoints 112 in the virtual interactive environment 104 causes the virtual environment generator 102 to present the different cube maps 110 for the different viewpoints 112. Moreover, as discussed in greater detail below regarding FIG. 2, the virtual environment generator 102 can store multiple cube maps 110 at different resolutions corresponding to the single viewpoint 114. Accordingly, the virtual environment generator 102 can be customizable to match computing resources of a user device 120 presenting the virtual interactive environment 104 by retrieving higher or lower resolution cube maps 110, 2D cube side images 116, and/or portions of 2D cube side images 116.

In some examples, multiple different data structures and/or features of the virtual interactive environment 104 can be formed by layering or mapping the feature onto the cube map 110 (e.g., at one or more of the 2D cube side images). Initially, one or more mapping locators 118 can be generated and layered onto a 2D cube side images 116 of the cube map 110 (e.g., by being manually drawn onto the 2D cube side image 116). The mapping locator(s) 118 can include a mapping point (e.g., mapping point 316 in FIGS. 3A and 3B) which defines a particular coordinate point on a coordinate plane defined by the 2D cube side image 116. The mapping point can act as defined mapping coordinate values to which various other types of data (e.g., a product model 122, an animation layer 124, etc.) can be mapped to, layered to, anchored to, or otherwise associated with, such that presenting a cube map 110 including the mapping point causes the virtual environment generator 102 to present any of the data associated with the mapping point at the location of the mapping point in the virtual interactive environment 104. In addition to the mapping point, in some examples, the mapping locator(s) 118 can include a mapping plane (e.g., 2D mapping plane 314 in FIGS. 3A and 3B), a mapping shape (e.g., 3D mapping shape 318 in FIGS. 3A and 3B), and/or other mapping structures to define mapping locations at the cube map 110 to which other data structures can be attached. In some instances, the 3D mapping box can have an opaque surface and be presented in the virtual environment generator 102 as a stand on which the product model 122 rests.

For instance, the virtual environment generator 102 can receive the product models 122 (e.g., which can be included in product data 108 received from a merchant system, as discussed below regarding FIG. 2) and map the product models 122 to the mapping locator(s) 118.

The virtual environment generator 102 can include one or more user interfaces 126 such that, by using the user interface(s) 126, the product models 122 can be "drag-and-dropped" to one of the mapping locators 118. For example, the product model 122 can be selected from a first portion of the user interface 126 (e.g., presenting one or more selectable product models) and carried to a second portion of the user interface 126 using the mapping locator(s) 118 that already define the particular mapping coordinates of the cube map 110. The product model(s) 122 provided drag-and-drop placement within the 3D virtual environment 104 can include one or more of 3D model files, 2D image files, and/or any type of data file to visually represent a product in the cube map 110. The various user interface(s) 126 are discussed in greater detail below regarding FIG. 2.

Moreover, in some instances, the virtual environment generator 102 maps one or more animation layer(s) 124 to the mapping locator(s) 118. The animation layer(s) 124 can be a visualization, such as a color event or a repeating color event (e.g., a change in color or lighting or the like) that can be stored and predefined as an effect layered over the cube map 110. The animation layer 124 can cause a scene created by the cube map 110 to have dynamic (e.g., moving, changing, active, etc.) visualizations, which can be layered onto the otherwise static image of the cube map (e.g., one of the 2D cube side images 116 For instance). The animation layer 124 can be a dynamic effect at the coordinates and/or pixels of the mapping point (e.g., a change in brightness, a change in color, a position shift, etc.). The animation layer(s) 124 can include various moving objects, people, shade layers, color layers, and the like (e.g., traversing a path defined by the mapping locator(s) 118). Additionally or alternatively, the animation layer(s) 124 can include an audio feature or audio hotspot. For instance, an audio file (e.g., a sound effect, a voice, music, or other audio sample) can be associated with the mapping locator 118 such that an interaction with the mapping locator 118 (e.g., a user input at or proximate to the mapping locator 118, navigating to a viewpoint near the mapping locator 118, etc.) causes the audio file to trigger and execute. In one example, the audio file can represent a door bell sound effect and the mapping locator 118 to which the audio file is connected is located at a door bell in the 3D virtual environment. Moreover, the mapping locator 118 can be a mapping plane and the animation layer 124 can be a dynamic effect occurring at portions of the mapping plane, or moving across at least portions of or the entire mapping plane. The animation layer(s) 124 are discussed in greater detail below regarding FIGS. 5A-6D.

Other types of data and layers can be mapped to the mapping locators 118. The virtual environment generator 102 can map one or more 2D videos to a mapping plane causing the 2D video to have a skew corresponding to a skew of the mapping plane. For instance, the mapping plane can have coordinates layered over a virtual surface of the virtual 3D space represented by the cube map 110, such as a wall of a virtual room in the virtual 3D space. As such, any mapping object mapped to the mapping plane, including the 2D video, can have a skew corresponding to the virtual surface, causing the 2D video to distort (e.g., as the virtual surface distorts) with respect to the perspective of the viewer to create a visualization of the 2D video being attached to the virtual surface in the virtual 3D space. Mapping the 2D video is discussed in greater detail below regarding FIGS. 3A and 3B. Additionally, a virtual character, a virtual object, a virtual structure, or other virtual item (e.g., which can include a dynamic and/or video portion) can be mapped to the mapping locator 118, such that the virtual item is presented at the coordinates of the mapping locator 118 (e.g., and/or with a skew of the mapping locator 118) when the scene at the viewpoint 114 is presented. Mapping a virtual character is discussed in greater detail below regarding FIG. 4B.

In some instance, the virtual environment generator 102 can include one or more interactive planes 128 which can be mapped to and/or layered onto the cube map 110. The one or more interactive planes 128 can define an area or coordinates at the cube map 110 for receiving a user input. The one or more interactive planes 128 can be a transparent layer (e.g., not visually represented when displayed at the user device) that, in response to receiving a user input, causes the virtual environment generator 102 to retrieve and/or present additional information associated with the one or more interactive planes 128. For instance, the one or more interactive planes 128 can be layered at least partly over the product model 122 and can be associated with the product data 108 associated with the product model 122. The interactive plane 128 can include designated icons (e.g., circle buttons), points, areas, objects, static or moving areas layered over other dynamic portions, navigation indicators, combinations thereof, and the like.

Figure 2:
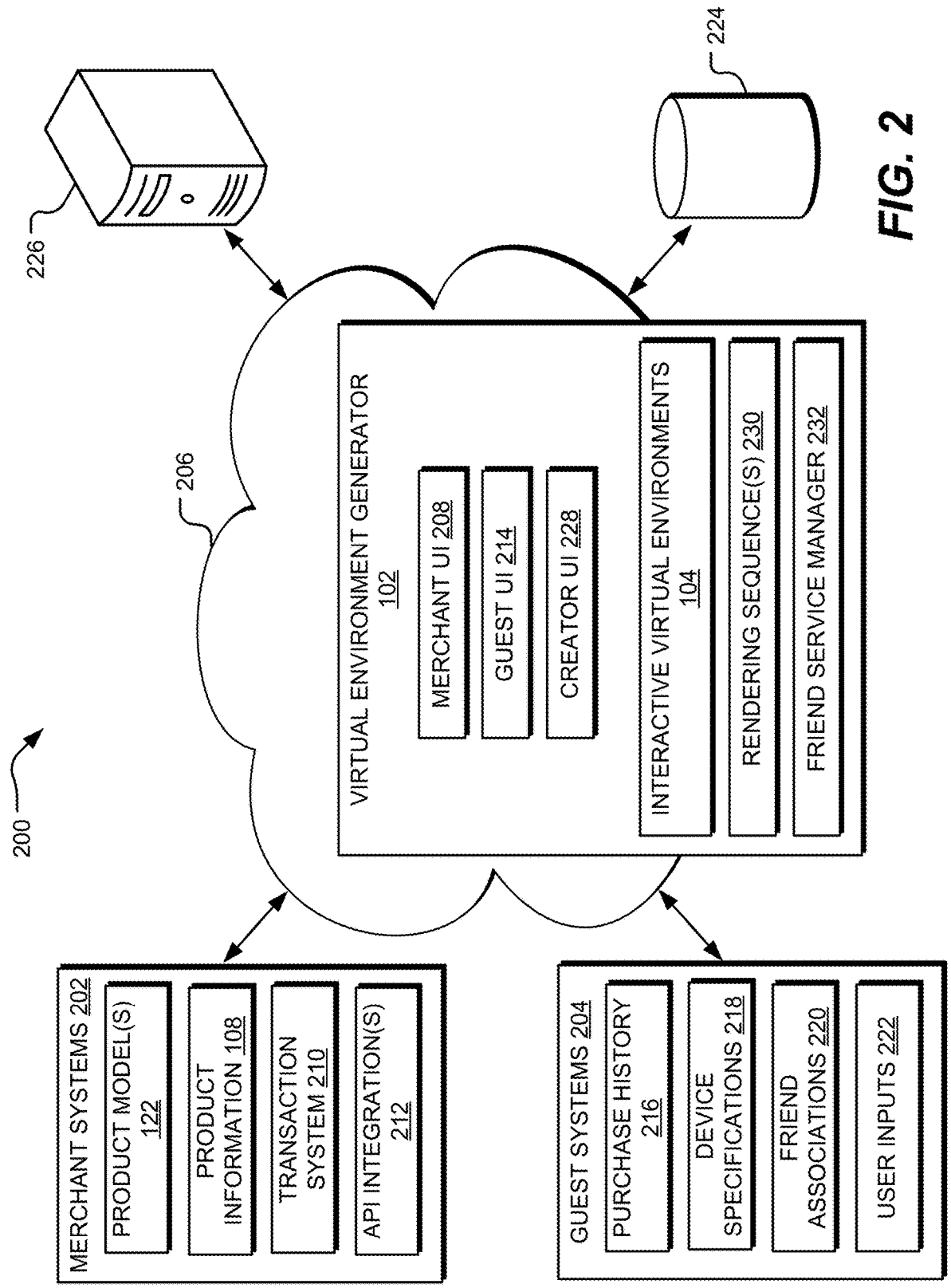
FIG. 2 illustrates an example system for generating a virtual interactive environment including a merchant system, a guest system, and one or more servers, which can form at least a portion of the system of FIG. 1.

The interactive plane(s) 128 can be drawn and/or layered directly onto a 2D cube side image 116, for instance, using a creator user interface (UI), as discussed regarding FIG. 2. Additionally or alternatively, the one or more interactive planes 128 can be created and then mapped to the mapping locator(s) 118 to layer the interactive plane(s) 128 onto the cube map 110 to establish coordinates of the interactive planes 128, using similar techniques as those discussed herein for mapping the product models 122, the animation layers 124, and various other virtual items.

Turning to FIG. 2, an example system 200 for generating the virtual interactive environment 104 is depicted. The system 200 can include the virtual environment generator 102 in communication with one or more merchant system(s) 202 and/or guest systems 204, for instance, via one or more network(s) 206. The example system 200 can form at least a portion of the system 100 depicted in FIG. 1.

In some instances, the merchant system(s) 202 can be one or more computing systems (e.g., computing system(s) 902 discussed below regarding FIG. 9) associated with and/or located at a merchant entity (e.g., a clothing retailer, a jewelry retailer, etc.). The merchant system(s) 202 can interact with the virtual environment generator 102 by establishing a network connection with the virtual environment generator 102 via the network(s) 206 and using a merchant interface between the virtual environment generator 102. The merchant interface can include a merchant UI 208, which can be presented at the merchant system(s) 202 (e.g., via a first web portal) for providing information to merchant personnel, and/or to receive input from the merchant system(s) 202. The merchant UI 208 can include a platform for making limited modifications to the virtual environment generator 102, such as uploading 2D videos, changing product models 122 and/or product data 108, viewing analytics, and the like. Moreover, the merchant interface can include a back-end interface between the merchant system(s) 202 and the virtual environment generator 102, such as a transaction system 210 established, established with various API integrations 212. The transaction system 210 can perform a transaction integration process between the merchant system(s) 202 so that transaction-related inputs received in the virtual environment generator 102 can be transferred to the transaction system 210 of the merchant system(s) 202. Receiving a user input can cause the virtual environment generator 102 to send an API call to a cart or checkout portion of the transaction system 210 of the merchant system 202.

For instance, selecting a purchase icon associated with a product model 122 can cause the virtual environment generator 102 to send an API call to the merchant system(s) 202 to initiate and/or execute the transaction via the transaction system 210. In other words, a checkout or cart API can integrate with APIs of the virtual environment generator 102 such that a user input selecting to purchase an item can route the selection to a purchasing interface hosted by the merchant systems 202. The merchant system(s) 202 can include one or more API integration(s) 212 with the virtual environment generator 102, such as a transaction system API integration, a product information feed API integration, and the like. In some examples, the merchant system(s) 202 include one or more servers or computing devices to generate and/or store the product information or product data 108, which can include the product model 122. The product data 108 can be the product model(s) 122 and/or other information related to the products of the merchant (e.g., product specifications, product price, product reviews, additional product models 122 or images, and the like). The product models 122 can be one or more 2D images or 3D models visually representing the products of the merchant. The product model(s) 122 can be highly detailed and/or hyper realistic to accurately depict fabric, textures, colors, and other visual aspects of the product of interest to potential buyers. The product data 108 and/or the product model 122 can be sent from the merchant system(s) 202 to the virtual environment generator 102 via the network(s) 206 (e.g., by manually uploading using the merchant UI 208 and/or via one or more API calls). For instance, a product information update can occur periodically (e.g., hourly, daily, weekly, seasonally, etc.) from a product information feed of the merchant system(s) 202. The product information can include one or more comma-separated values (CSV) files.

The system 200 can also comprise the guest system(s) 204. The guest systems 204 can include one or more user devices (e.g., the computing system 902 depicted in FIG. 9) for accessing and interacting with the virtual interactive environment 104. The virtual interactive environment 104 can be presented as a guest UI 214, or as at least a portion of the guest UI 214, at a display or screen of a user device forming the guest systems 204. Like the merchant system(s) 202, the guest systems 204 can communicate with the virtual environment generator 102 via a network connection provided by the network(s) 206. The network(s) 206 can include any type of network, such as the Internet, an intranet, a Local Area Network (LAN), a Wide Area Network (WAN), a Virtual Private Network (VPN), a Voice over Internet Protocol (Vol P) network, a wireless network (e.g., Bluetooth), a cellular network (e.g., 4G, 5G, LTE, etc.), satellite, combinations thereof, etc. The network 206 can include a communications network with numerous components such as, but not limited to gateways routers, servers, and registrars, which enable communication across the network 206. In one implementation, the communications network(s) includes multiple ingress/egress routers, which may have one or more ports, in communication with the network 206. Communication via any of the networks can be wired, wireless, or any combination thereof.

The guest systems 204 can include a purchase history 216 associated with the guest systems 204 (e.g., the user device and/or the user associated with the user device). The guest systems 204 can also include device specifications 218 to indicate various hardware or software characteristics of the guest systems 204 (e.g., a processing capability, an amount of Random-Access Memory (RAM), an amount of memory, a display size, a display resolution, and the like). Moreover, one or more friend associations 220 can be included in the guest system 204 to indicate other guest systems 204 (e.g., other users and/or user devices) that have established a friend status with respect to a first user. The one or more friend associations 220 can be used by the virtual environment generator 102 to facilitate a friend service (e.g., presenting the virtual interactive environment 104 at multiple devices), as discussed in greater detail below regarding FIG. 8A. Finally, the guest systems 204 can receive, generate, or otherwise originate one or more user inputs 222 from a guest or user interacting with the virtual interactive environment 104. The one or more user inputs 222 can include a navigation input (e.g., a selection of a navigation indicator, a viewpoint 114, a drag/scroll, and the like), a browsing or hovering input, an interaction with the interactive plane(s) 128, a preference input providing preference information in response to a prompt, a transaction selection or purchase input, combinations thereof, and the like. Of course, the one or more user inputs 222 can include various other inputs received at the guest systems 204 as well.

In some examples, the system 200 can include one or more databases 224 for storing the data files and/or software instructions discussed herein, and one or more server devices 226 for performing operations of the virtual environment generator 102 by accessing the data stored in the one or more databases 224 and/or executing algorithms. The one or more databases 224 and/or the one or more server devices 226 can form at least a portion of a computing system of a virtual environment creator system, as discussed below regarding FIG. 9. For instance, the virtual environment generator 102 can store the virtual interactive environments 104 at the one or more databases 224. The virtual interactive environment 104 can be retrieved from the one or more databases 224 to present at the guest systems 204 (e.g., at the guest UI 214). In some examples, the one or more server devices 226 can host the virtual interactive environment 104 as a second web portal using data stored at the one or more databases 224, such that any guest systems 204 accessing the second web portal can access the guest UI 214 and interact with the virtual interactive environment 104. The one or more server devices 226 may be a single server, a plurality of servers with each such server being a physical server or a virtual machine, or a collection of both physical servers and virtual machines. In another implementation, a cloud hosts one or more components of the system 200. The one or more server devices 226 may represent an instance among large instances of application servers in a cloud computing environment, a data center, or other computing environment.

Furthermore, the virtual environment generator 102 can include a creator UI 228 for receiving inputs to create the virtual interactive environment 104. The creator UI 228 can be presented at a display of a virtual environment creator system (e.g., the system 100, the system 200, etc.), such as a display associated with an entity providing a service to create the virtual interactive environment 104 for the merchant system(s) 202. At the creator UI 228, the data received from the merchant system 202 (e.g., the product data 108, the product models 122, etc.) can be integrated (e.g., placed, anchored, associated with, and/or mapped) onto the cube map 110. Moreover, the creator UI 228 can be used to generate the cube map 110, for instance, by presenting the computer-generated 3D model and receiving inputs or selections choosing the coordinates of the viewpoints 112 in the computer-generated 3D model 106 on which the cube maps 110 are based. The creator UI 228 can also be used to create the mapping locators 118, create the interactive planes 128, create the animation layer 124, mapping various items to the mapping locators 118, and/or performing other steps discussed herein for generating the virtual interactive environment 104.

In some examples, the one or more databases 224 can store one or more rendering sequence(s) 230 that determine how the 2D cube side images 116 of the cube map 110 are rendered. For instance, the rendering sequence(s) 230 can determine which of the 2D cube side images 116 is the front 2D cube side image (e.g., based on a cube side identifier) and render the front 2D cube side image before other 2D cube side images 116 (e.g., the right, left, top, bottom, and/or back 2D cube side images). In some examples, the rendering sequence(s) 230 can indicate that virtual environment generator 102 is to render a lower resolution cube map 110 representing the scene initially, and then render a higher resolution cube map 110 representing the same scene after rendering the lower resolution cube map 110. In some instances, the rendering sequence(s) 230 can render, at a higher resolution, a particular 2D cube side image 116 and/or a portion of the particular 2D cube side image 116 in response to the portion including an item of high interest, while at least initially rendering other 2D cube side images 116 and portions of the 2D cube side images 116 at a lower resolution. The item can be determined to be the item of high interest based on the user inputs 222, the purchase history 216, the friend associations 220, the product data 108, combinations thereof, and the like. The rendering sequence 230 can be associated with, via one or more matching identifiers, and facilitate rendering for portions of a particular 2D cube side image 116 of a particular cube map 110, multiple 2D cube side image 116 of a particular cube map 110, and/or multiple 2D cube side images 116 of multiple cube maps 110.

In some instances, the virtual environment generator 102 can use static images from first data source(s) and dynamic images from second data source(s) to generate the virtual interactive environment 104. The static images can be the product model 122 provided from the merchant system 202 and the 2D cube side images 116 of the cube map 110 generated by the virtual environment generator 102, which can be based on the computer-generated 3D model 106. The dynamic images can include the product models 122 (e.g., videos or animations of product models), the animation layers 124, the 2D videos, the virtual characters, the virtual items, combinations thereof, or any other components of the virtual interactive environment 104 that include motion or changing color or light.

In some instances, the virtual environment generator 102 further includes a friend service manager 232. The friend service manager 232 can track the one or more friend associations 220 and provide screen sharing, multi-casting, messaging services, and various other services to provide a friend service for the virtual environment generator 102. The friend service can cause the virtual interactive environment 104 to be presented at multiple guest systems 204 (e.g., multiple user devices), receive user inputs from the multiple guest systems 204, and share information about the interactive session between the multiple guest systems 204, such as presenting the multiple viewpoints of the multiple guest systems 204 simultaneous on at least one of the displays. Additional features of the friend service are discussed in greater detail below regarding FIG. 8A.

In some instances, the one or more databases 224 can store data used for any of the operations discussed herein for generating the virtual interactive environment 104 and/or presenting the virtual interactive environment 104 at the guest systems 204. For instance, the one or more databases 224 can store the product data 108, the product model 122, the computer-generated 3D model 106, the cube maps 110 (e.g., at different resolutions), the virtual interactive environment 104, the rendering sequences 230, the friend service manager 232, the viewpoints 112, an incremental path connecting the viewpoint 112, associations between these different data files, combinations thereof, and the like. Moreover, the data in the database(s) 224 can be aggregated and associated with profiles associated with the merchant system(s) 202 and/or the guest systems 204 to perform the operations discussed herein.

Figure 3A:
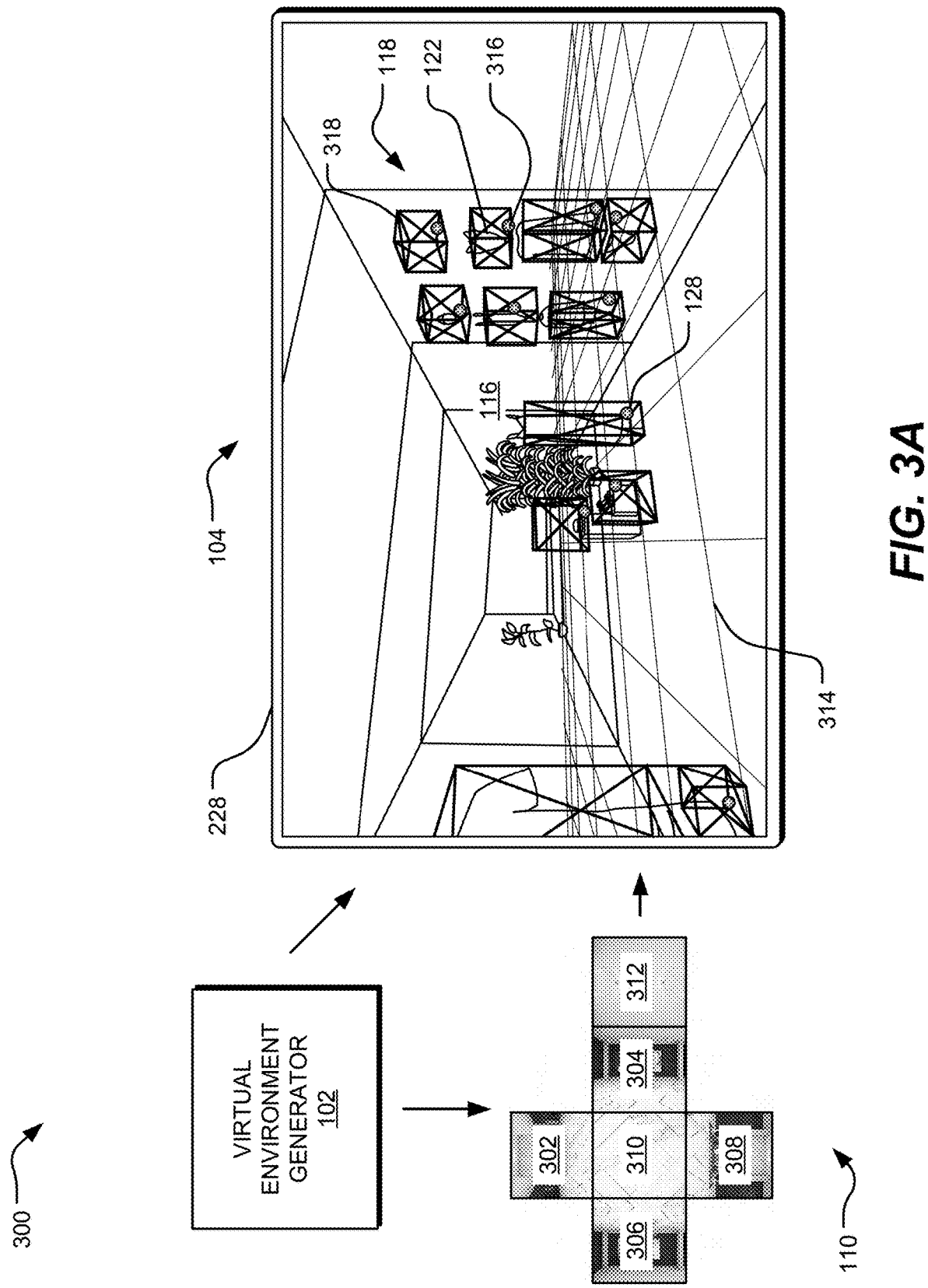
FIGS. 3A and 3B illustrate an example system for generating a virtual interactive environment using mapping locators, which can form at least a portion of the system of FIG. 1.
Figure 3B:
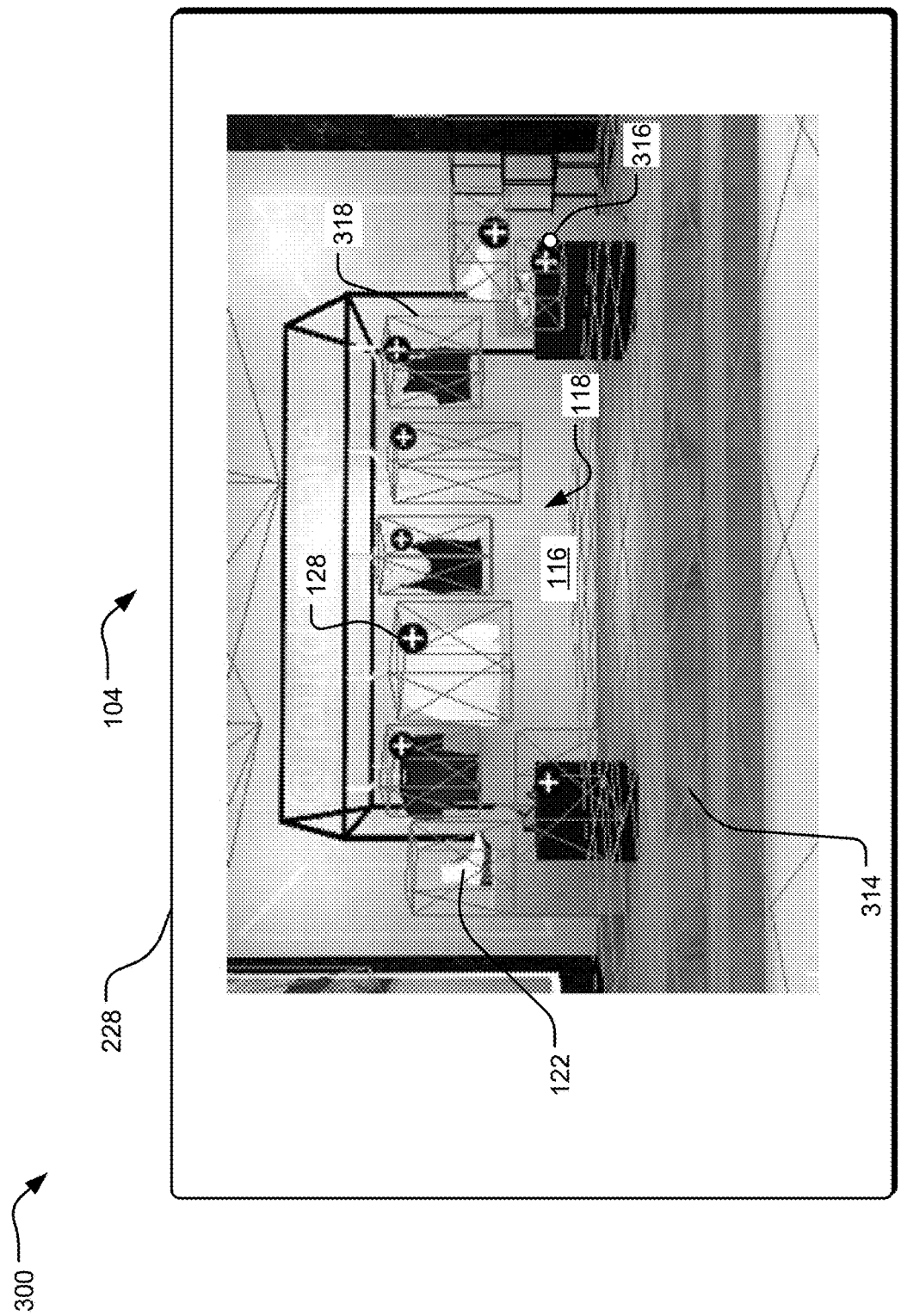

Turning to FIGS. 3A and 3B, an example system 300 to provide the virtual interactive environment 104 with the virtual environment generator 102 is depicted. The system 300 can perform a cube map conversion process to create the cube map 110 from the computer-generated 3D model 106. Moreover, the system 300 can include one more mapping locator(s) 118 and various items mapped to the mapping locator(s) 118 to form a mapping layer over the cube map 110 representing the scene. The system 300 can form at least a portion of the system 100 depicted in FIG. 1. FIG. 3B depicts how the system 300 may be presented, for instance, at the creator UI 228.

In some examples, the system 300 generates the cube map 110, corresponding to the viewpoint 114 via the cube map conversion process to form the plurality of 2D cube side images 116. The plurality of 2D cube side images 116 can include a front 2D cube side image 302, a right 2D cube side image 304, a left 2D cube side image 306, a back/rear 2D cube side image 308, a bottom/floor 2D cube side image 310, and/or a top/ceiling 2D cube side image 312. To present the scene represented by the cube map 110, the virtual environment generator 102 can render the front 2D cube side image 302 before the other 2D cube side images 116 and/or at a higher resolution than the other 2D cube side images 116 (e.g., at least initially). This can be determined by the rendering sequence(s) 230. The 2D cube side images 116 can be formed from hundreds of smaller square images. In some examples, the 2D cube side images 116 can be static images, such as JPEGs.

In some instances, the computer-generated 3D model 106 represents a virtual structure such as a virtual building. A virtual 3D space of the computer-generated 3D model 106 can be an inside of the virtual building. In this example, a plurality of viewpoints 112 can be generated and/or selected at coordinates of the computer-generated 3D model 106 such that the plurality of viewpoints 112 represent a plurality of rooms inside the virtual building. Linking the viewpoints 112 together can form a traversable and incremental path between scenes formed by the cube maps 110 representing the rooms inside the virtual building.

In some examples, the mapping locator(s) 118 can be generated and layered onto the cube map 110. The mapping locator(s) 118 can include a variety of shapes and structures, such as a 2D mapping plane 314, a mapping point 316, and/or a mapping shape 318. The mapping shape 318 can be a 3D mapping locator 118, such as a mapping box (e.g., a rectangular prism). The virtual environment generator 102 can include techniques for defining locations, shapes, and sizes of the mapping locator(s) 118. For instance, the creator UI 228 can have a drawing function such that the mapping point 316 can be created by selecting a point or coordinate on the static 2D cube side image 116 of the cube map 110. A plurality of corners of the 2D mapping plane 314 and/or the mapping shape 318 can be created by selecting a plurality of points or coordinates on the static 2D cube side image 116 of the cube map 110.

In some examples, the mapping locator(s) 118 can be formed to align with, replicate, or otherwise correspond to virtual surfaces or structures of the virtual 3D space represented by the computer-generated 3D model 106. For instance, the 2D mapping plane 314 can be a horizontal 2D mapping plane 314 to correspond to the virtual surface of the floor of the virtual room. Additionally or alternatively, the 2D mapping plane 314 can be a vertical 2D mapping plane 314 corresponding to a virtual wall surface of the computer-generated 3D model 106. It is to be understood that the virtual surfaces of the computer-generated 3D model 106 only appear to have depth but are represented as the flattened, 2D cube side images 116. By layering the mapping locator(s) 118 onto the cube map 110, the virtual environment generator 102 can create a mapping layer with three-dimensional depth. Various items can be mapped to the mapping layer with three-dimensional depth, creating an illusion that the mapped items are immersed in the virtual 3D space of the computer-generated 3D model 106 when, in actuality, the mapped items are mapped to the mapping locators 118, and the mapping locators 118 are defined to at least partly replicate some of the virtual 3D space.

In some examples, the mapping locators 118 can have coordinates, a location, and/or a position spaced a distance apart from the viewpoint 114, such that items mapped to the mapping locator(s) 118 are fully or mostly in view from the viewpoint 114. Moreover, the viewpoint 114 can be spaced apart from virtual surfaces of the virtual 3D space by one or more predetermined distances to provide a full or mostly full view of the virtual surface and items mapped to a mapping locator 118 at the virtual surface. For instance, the predetermined distance can correspond to at least a foot, two feet, three feet, four feet, five feet, etc. from a virtual wall surface (e.g., wherein "feet" is virtual feet of the virtual 3D space).

Upon generating the mapping locator(s) 118, the virtual environment generator 102 can map various items to the mapping locator(s) 118. For instance, the product model 122 (e.g., received from a product feed API of the merchant systems 202 and/or a catalog) can be placed at and associated with the mapping locator 118. A size of the product model 122 can be adjusted and the position arranged to look realistic within the virtual 3D space. The product model 122 can be mapped to a 2D mapping plane 314. As such, natural-looking depth and 3D perspective can be imparted onto the product model 122 by skewing the product model 122 with the same skew of the 2D mapping plane 314. In other words, the product model 122 can appear to have 3D depth caused by the skew of the mapping locator 118. First product models 122 can be mapped to the mapping locators 118 and the virtual interactive environment 104 can be "published." The first product models 122 can be replaced with second product models 122 at the mapping locators 118 and the virtual interactive environment 104 can be "republished" with the second product models 122. As such, the product models 122 can be easily changed to reflect new product releases, product availability, and/or seasonal changes (e.g., using the same virtual interactive environment 104). In some instance, the product models 122 can be extracted and/or independent of the cube map 110, and can be mapped in at the front end (e.g., after rendering the cube map 110 without product models 122). In this situation, the product model 122 can be dragged and dropped to desired mapping locators 118 (e.g., using the creator UI 228 which can form a portion of the merchant UI 208 in some instances). In other words, having the product model 122 defined separate from the background formed by the cube map 110 can enable dynamic product rendering and personalization in a computationally efficient manner. Locations and/or coordinates of the mapping locator(s) 118 and the product models 122, and associations between the two can be stored at the one or more databases 224 (e.g., product ID values).

Figure 4A:
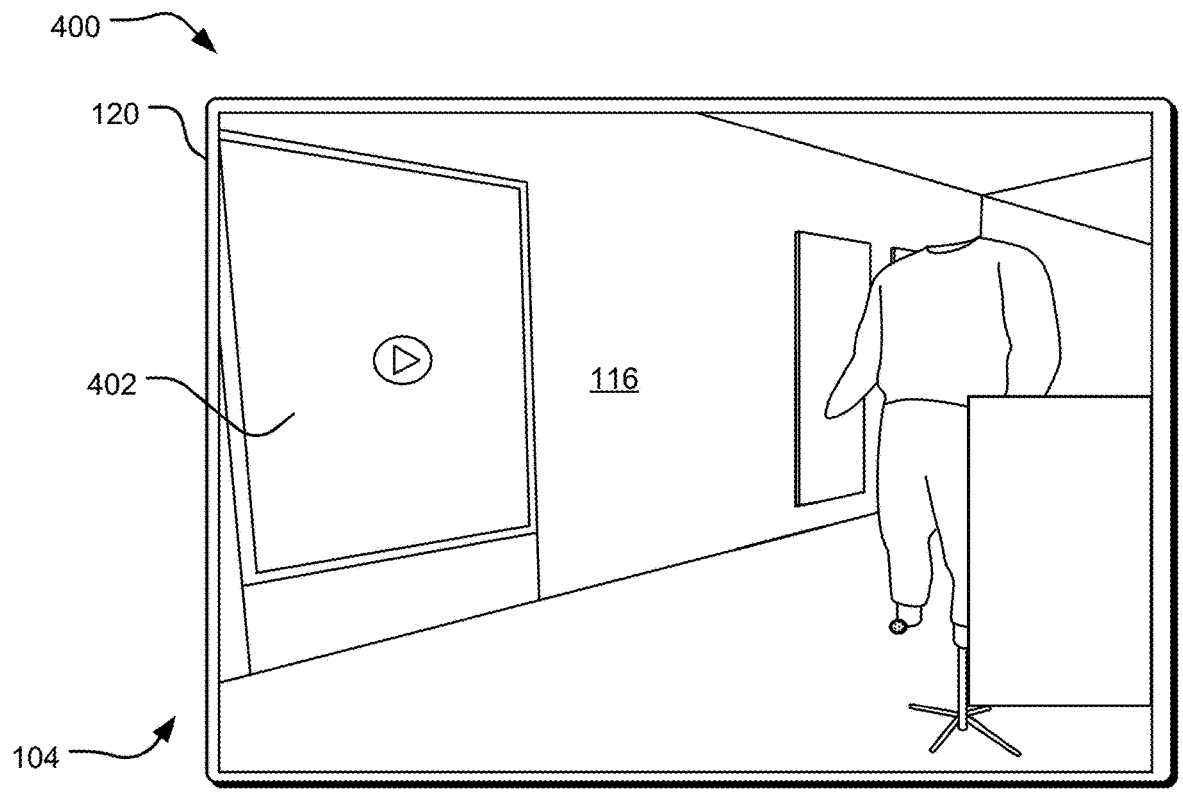
FIGS. 4A and 4B illustrate an example system for generating a virtual interactive environment using a 2D video and/or a virtual character, which can form at least a portion of the system of FIG. 1.
Figure 4B:
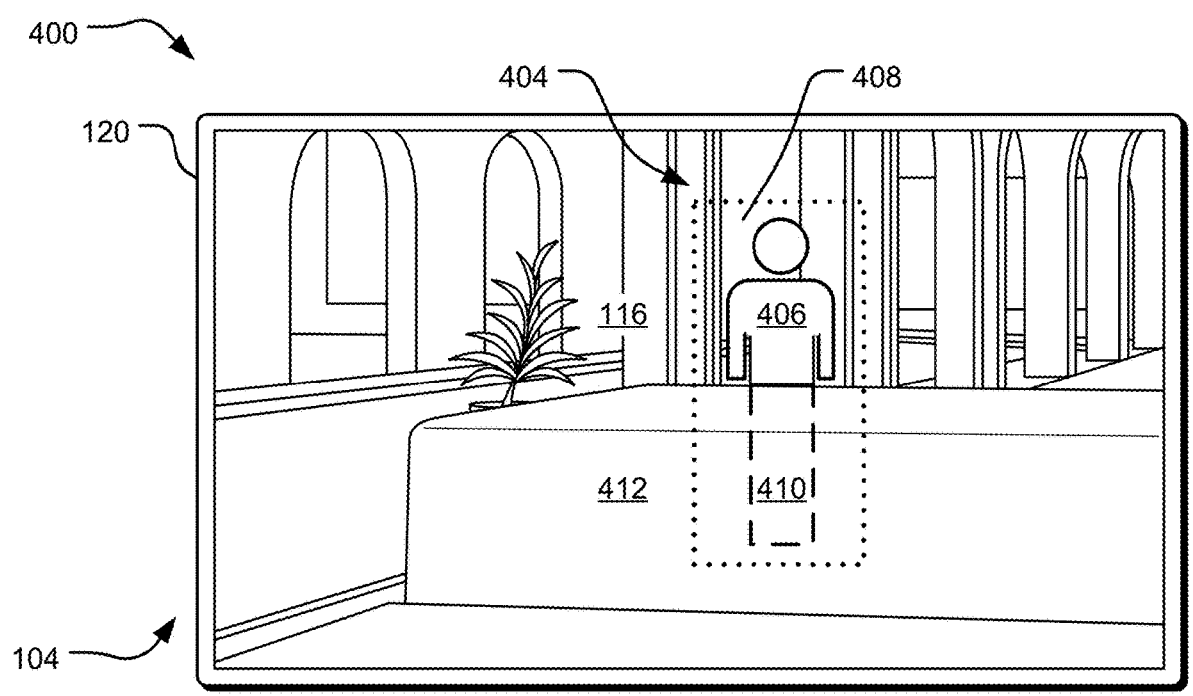

FIGS. 4A and 4B illustrate an example system 400 to provide the virtual interactive environment 104 with the virtual environment generator 102. The system 400 can include a 2D video 402 mapped onto the cube map 110 and/or a virtual character 404 mapped onto the cube map 110. The system 400 can form at least a portion of the system 100 depicted in FIG. 1.

For instance, the 2D video 402 can be mapped to the 2D mapping plane 314 corresponding to a virtual wall surface of the virtual 3D space. In some instances, the 2D video 402 can be triggered to play in-scene, for instance, in response to a user input navigating to the viewpoint 114 from which the 2D video 402 is visible and/or or the portion of the cube map 110 including the 2D video 402 being rendered in a viewing window (e.g., at the guest UI 214). Additionally or alternatively, the 2D video 402 can play in response to a user input (e.g., a hover over and/or a selection). The 2D video 402 can include video content related to one or more product models 122 at the viewpoint 114. The 2D mapping plane 314 can define a skew applied to any items mapped to the 2D mapping plane 314, such as the 2D video 402. The skew can give the mapped 2D video a 3D appearance by distorting the item based on the viewing angle from the viewpoint 114. The skew of the 2D mapping plane 314 can correspond to a virtual wall surface, and so that the corresponding skew of the 2D video 402 can cause the 2D video 402 to appear to be a screen attached to the virtual wall surface.

In some examples, the virtual character 404 can also be mapped to the cube map 110. The virtual character 404 can be a video file of an object, avatar, person, character, animal, etc. The video file can be a square or rectangular video with a dynamic color area 406 and a static color area 408. For instance, the dynamic color area 406 can be the portion(s) of the video file including motion and/or changing pixel values, such as the portions including the animated or virtual character 404, object, avatar, person, animal, etc. The static color area 408 can be the portion(s) of the video file omitting motion or having constant, unchanging pixel values. The static color area 408 can include a background portion (e.g., a green screen). Moreover the video file can include an environment feature in motion (e.g., a stream, trees, a moving door, etc.). The virtual character 404 can be mapped to the coordinates of the mapping locator(s) 118, such as the 2D mapping plane 314, the mapping point 316, the mapping shape 318, and, as such, can take on a skew, depth, and/or other distortion from the mapping locator 118 to give the virtual character 404 a 3D appearance. The static color area 408 can be removed, cut, or made transparent, leaving only the dynamic color area 406. Additionally, the virtual character 404 (e.g., or other type of video file) can have a removed portion 410 corresponding to an object or structure 412 of the 2D cube side image 116 (e.g., flattened from the original computer-generated 3D model 106), to create an appearance that the virtual character 404 is behind the object or structure 412 of the 2D cube side image 116. For instance, the object or structure 412 can be a counter or a table and the removed portion 410 can be a lower portion or legs of the virtual character 404. Moreover, the video file can have mirror image video file viewable from an opposite side to make the virtual character 404 visible from either direction. In some examples, the virtual character 404 is a pre-recorded video file or clip speaking about a product represented by the product models 122. The virtual character 404 can perform one or more actions such as speaking a word or phrase, gesturing towards a product model 122, walking around (e.g., toward the viewpoint, around the viewpoint, away from the viewpoint, etc.), disappearing and/or reappearing, and the like). In some examples, the virtual character 404 is located at a same viewpoint 114 as the product models 122 based on matching one or more keywords or tags in the text of the speech with those of the product model 122.

Figure 5A:
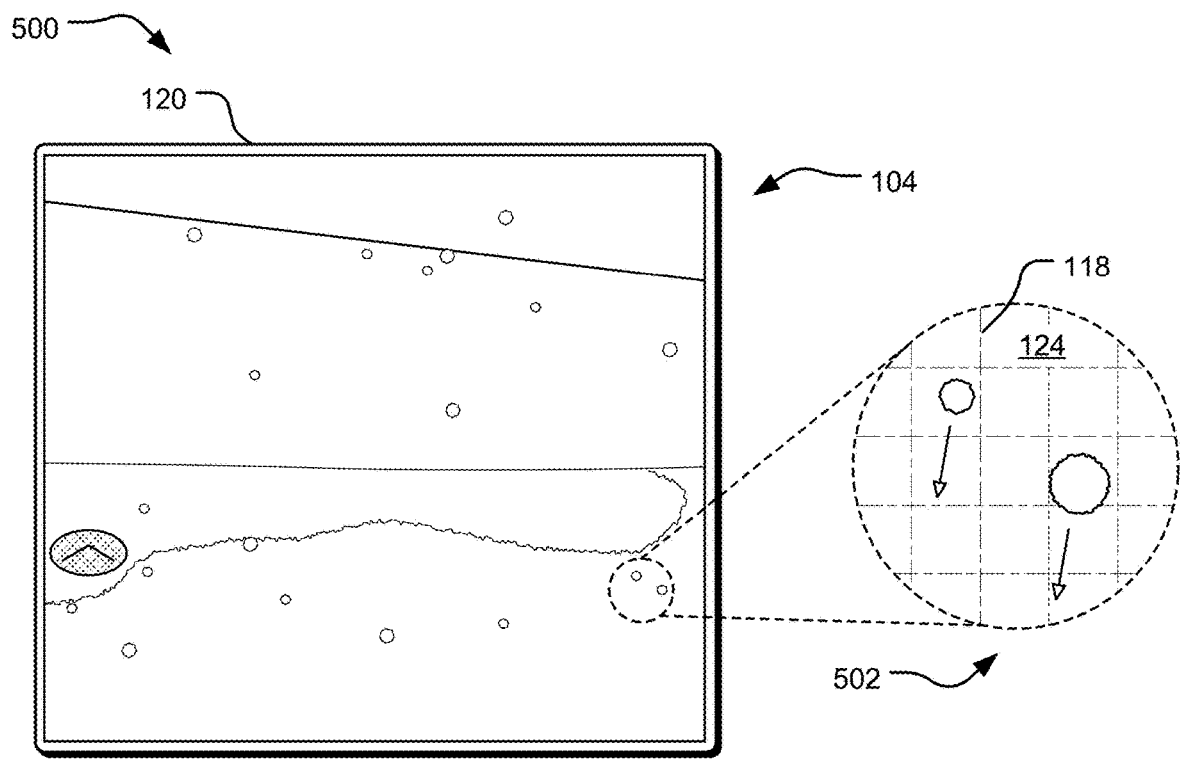
FIGS. 5A-5D illustrate an example system for generating a virtual interactive environment using animation layers, which can form at least a portion of the system of FIG. 1.
Figure 5B:
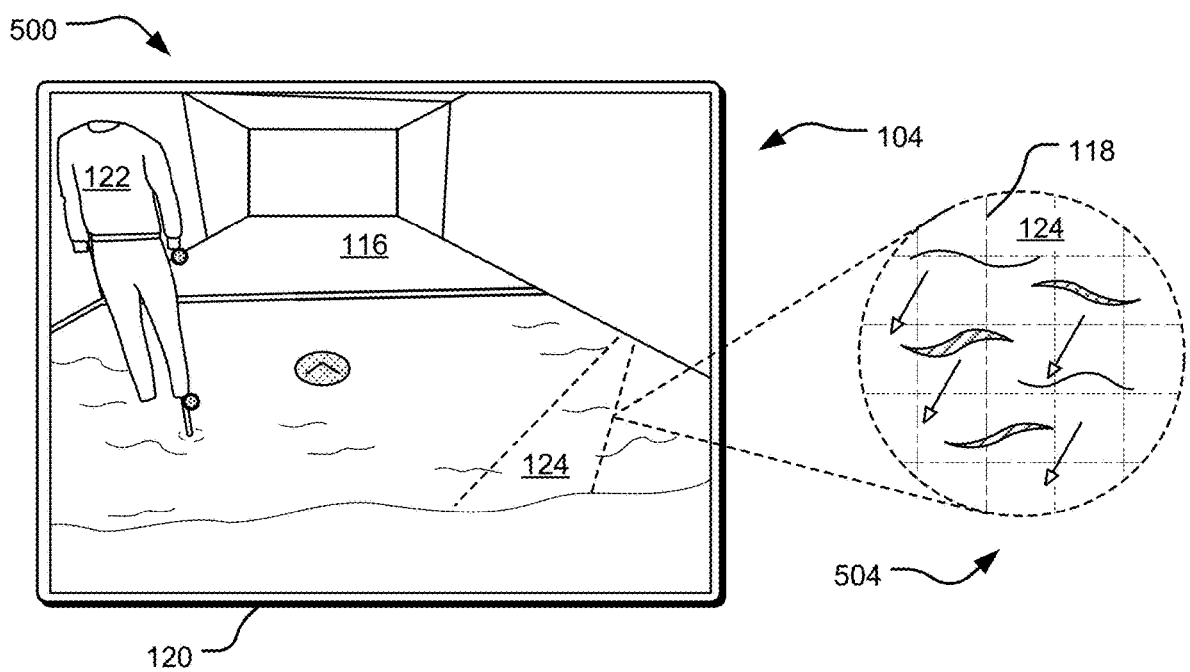
Figure 5C:
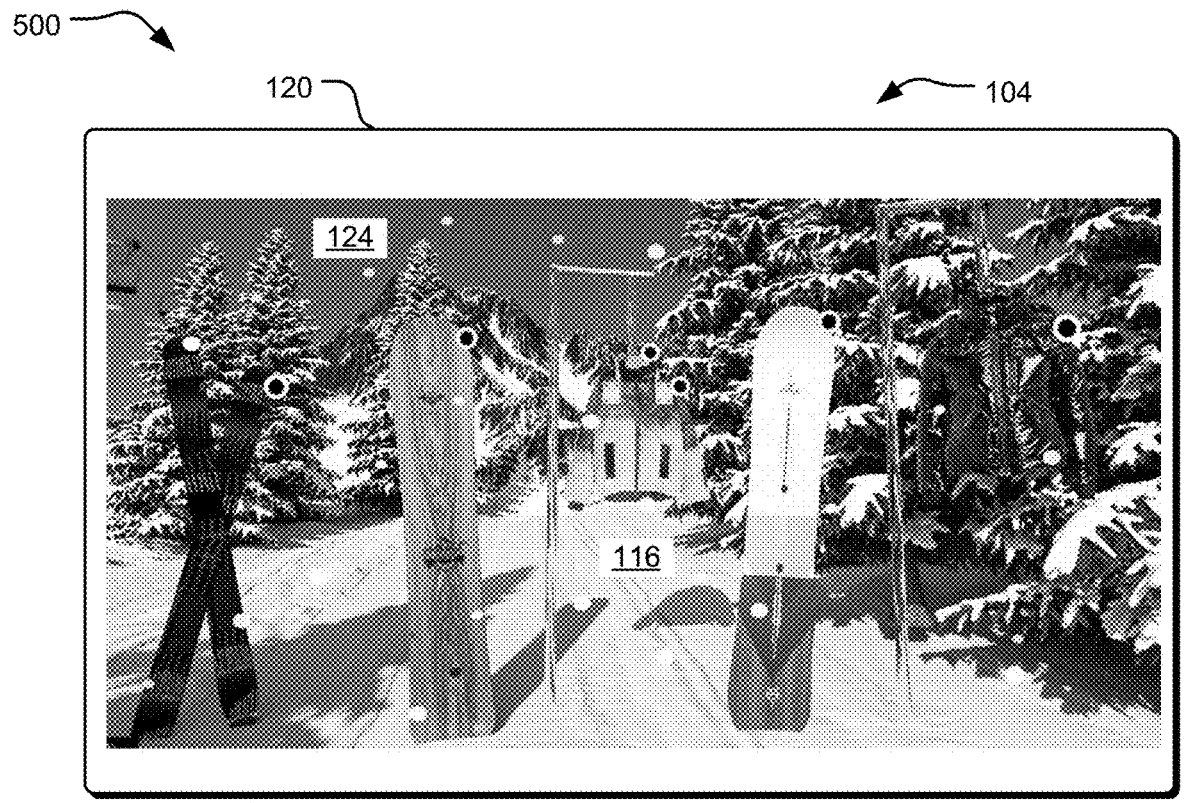
Figure 5D:
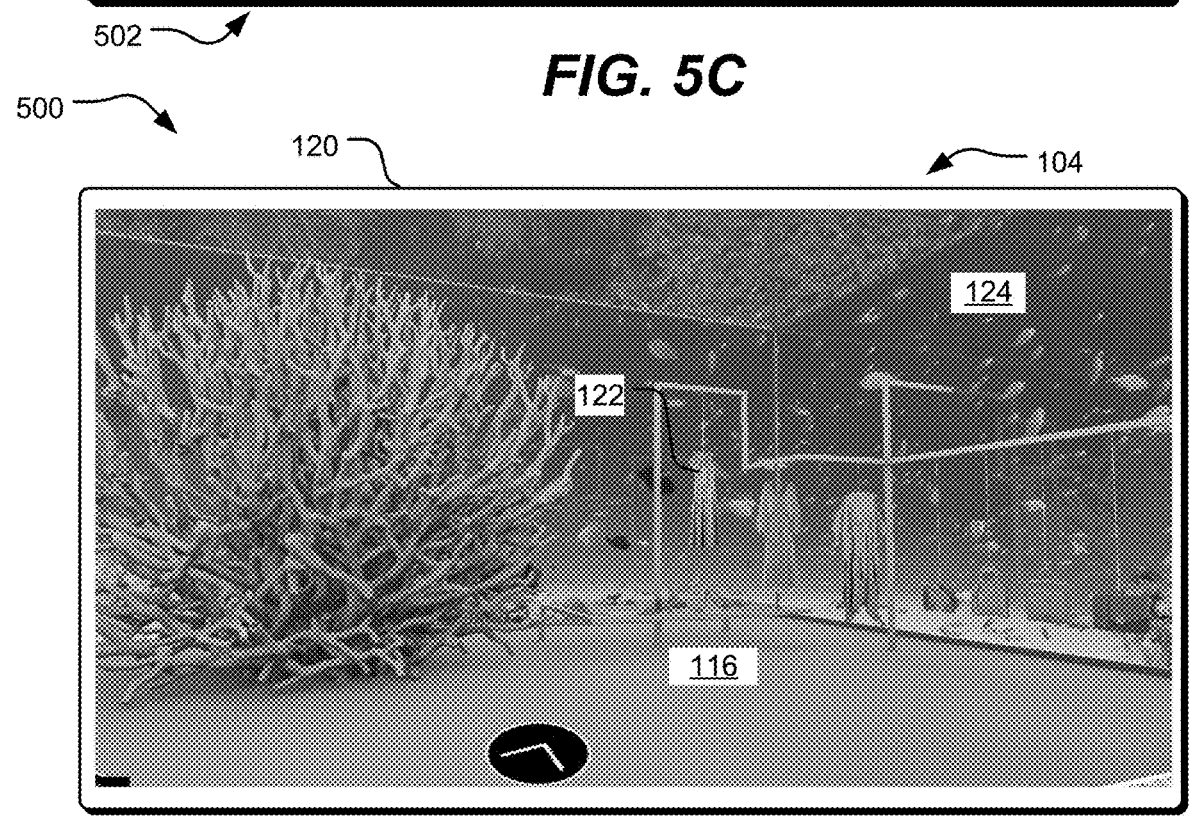

FIGS. 5A-5D illustrate an example system 500 to create the virtual interactive environment 104 with the virtual environment generator 102. The system 500 can include the one or more animation layer(s) 124, such as a precipitation animation layer 502 and/or a fluid texture animation layer 504. The system 500 can form at least a portion of the system 100 depicted in FIG. 1. FIGS. 5C and 5D depict how the system 500 may be presented, for instance, at the guest systems 204 (e.g., the user device 120) and/or the guest UI 214.

Like other items discussed herein, the animation layer 124 can be mapped to the mapping locator(s) 118. Additionally or alternatively, a point, boundary, or area of the animation layer 124 can be defined and/or mapped directly onto the cube map 110 (e.g., using similar techniques for generating the mapping locator(s) 118 at the creator UI 228). The animation layer(s) 124, such as the precipitation animation layer 502 and the fluid texture animation layer 504, can include one or more repeating color events.

For instance, the precipitation animation layer 502 can be a rain layer or snow layer defined over a vertical 2D plane (e.g., an animation layer plane or the 2D mapping plane 314) and can be layered over an entire 2D cube side image 116. The precipitation animation layer 502 can have a top boundary and a bottom boundary. Precipitation objects (e.g., drawn or digitally created snowflakes, rain drops, etc.) which can vary in size to give an appearance of depth, can move from the top boundary to the bottom boundary to create the repeating color event of the precipitation animation layer 502, such as falling snow or rain.

Additionally, the one or more animation layers 124 can include the fluid texture animation layer 504. The fluid texture animation layer 504 can define a repeating color event that causes a virtual surface of the cube map 110 to appear to have a flowing or moving fluid surface, such as a water surface texture. The repeating color event can be a lighting event with a defined travel path (e.g., from a first side of the animation layer plane to a second side of the animation layer plane), a defined travel speed, a frequency of repetition, and/or a shadow shape, a light shape, a light intensity, and the like to create the effect of light reflecting off the surface of water.

Figure 6A:
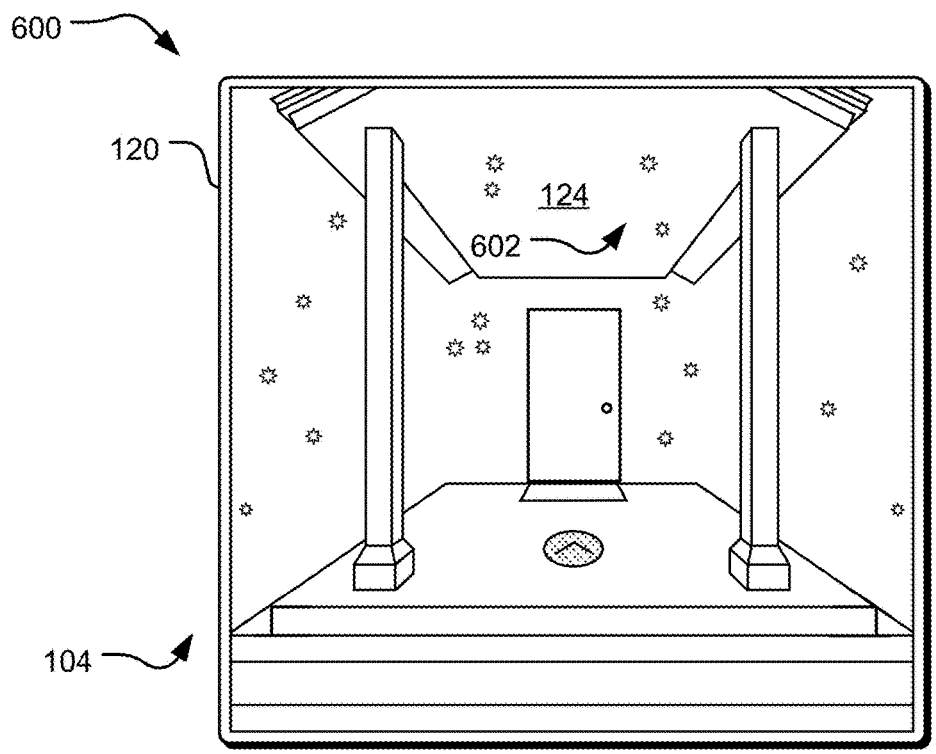
FIGS. 6A-6D illustrate an example system for generating a virtual interactive environment using animation layers, which can form at least a portion of the system of FIG. 1.
Figure 6B:
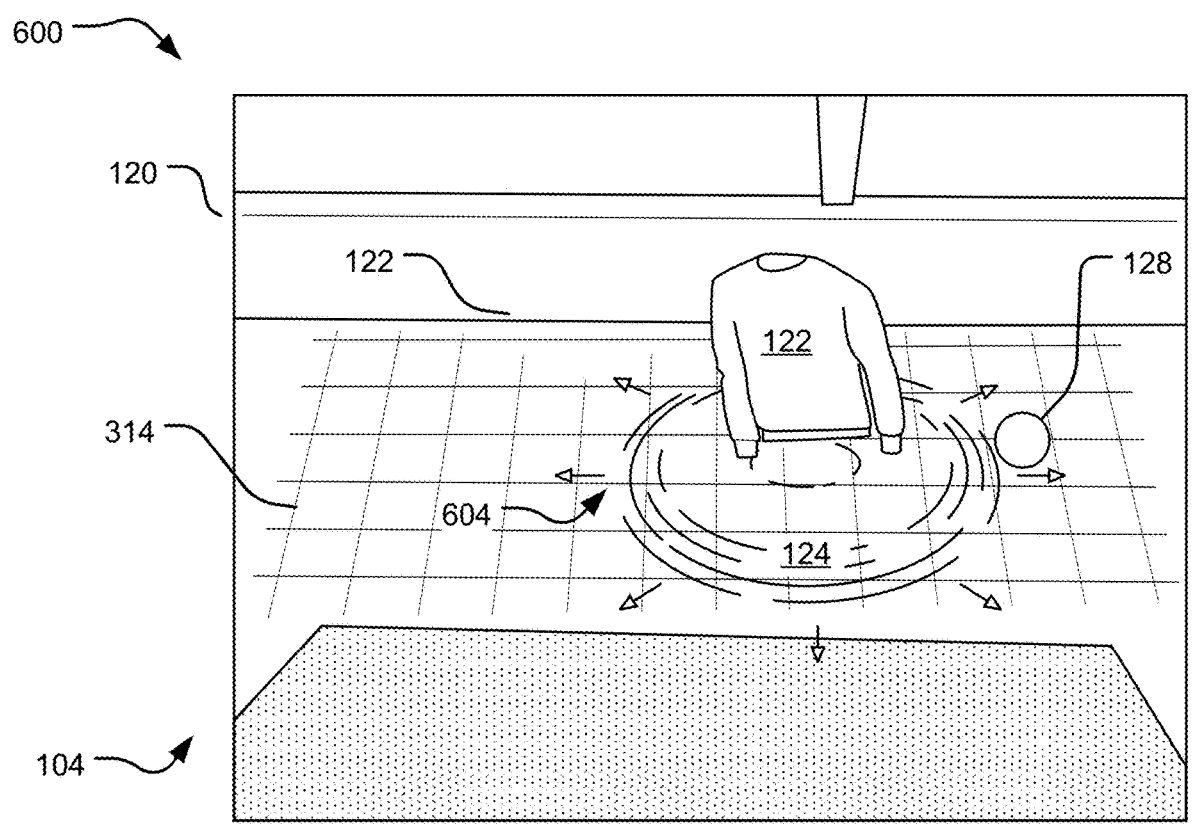
Figure 6C:
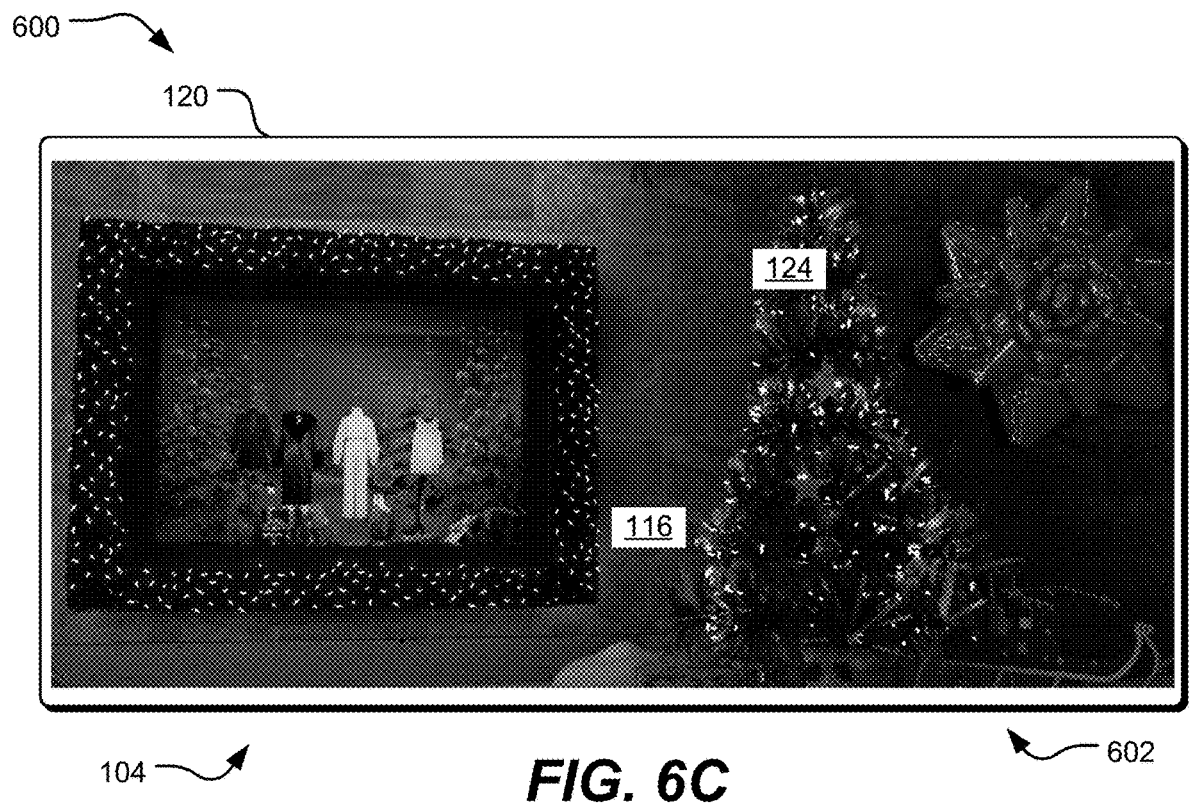
Figure 6D:
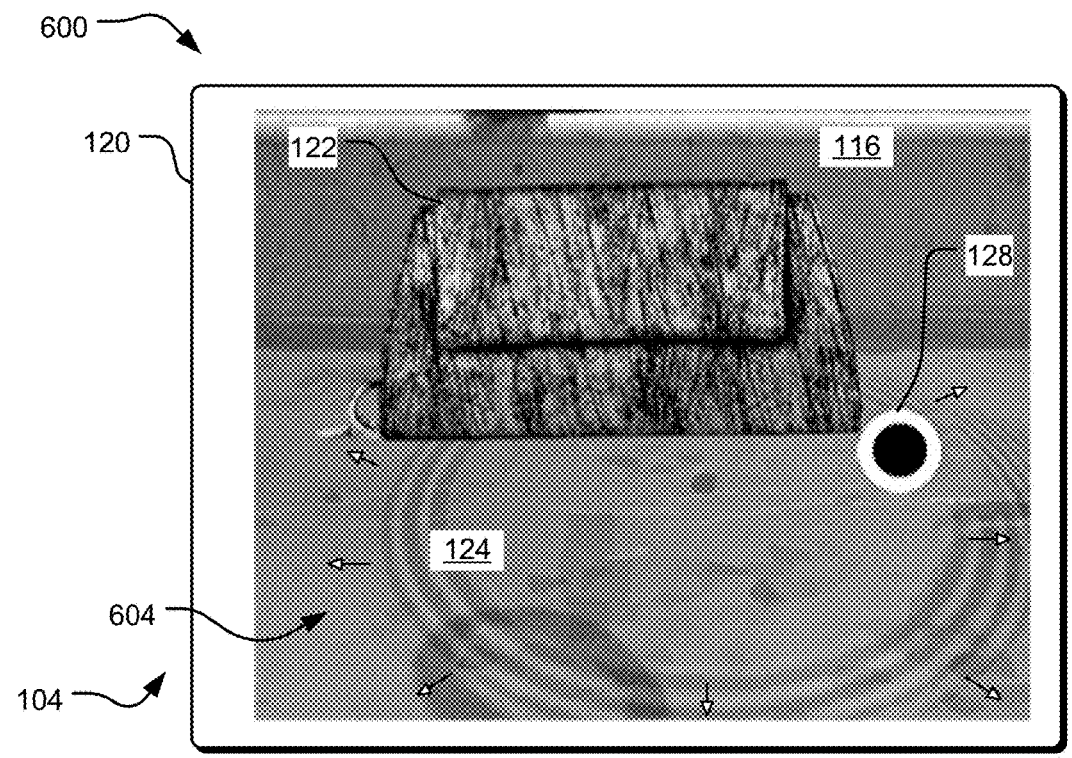

FIGS. 6A-6D illustrate an example system 600 to provide the virtual interactive environment 104 with the virtual environment generator 102. The system 600 can include the one or more animation layer(s) 124, such as a twinkling layer 602 and/or a rippling animation layer 604. The system 600 can form at least a portion of the system 100 depicted in FIG. 1. FIGS. 6C and 6D depict how the system 600 may be presented, for instance, at the guest systems 204 and/or the guest UI 214.

In some examples, the one or more animation layer(s) 124 include the twinkling layer 602. The twinkling layer 602 can define a repeating color event as one or more points on the 2D cube side image 116 and/or one or more mapping points 316. The repeating color event can be a changing brightness or color at the point(s) and/or of a shape (e.g., a circle, a star shape, I man irregular shape, etc.) at the point(s). For instance, the twinkling layer 602 can cause various twinkle-light shaped images to repeatedly get brighter and dimmer, causing a twinkling effect (e.g., similar to Christmas lights).

In some instances, the animation layer(s) 124 can include the rippling animation layer 604. The rippling animation layer 604 can create a light effect corresponding to a shape of the product model 120 to create an appearance of shadows or ripples moving on the water below the product model 122, such as alternating shadow rings to create a wave/rippling fluid texture. The product model 122 can have a shape (e.g., a circular shape), and the rippling animation layer 604 can have a motion and/or shape corresponding to the shape of the product model 122, such as concentric shadow circles representing ripples radiating outward (e.g., for round products like jewelry). The animation layer 124 discussed herein can be automatic events or triggered events, such as a color event that initiates in response to user input, such as a hover over or selection of the interactive plane(s) 128.

Figure 7A:
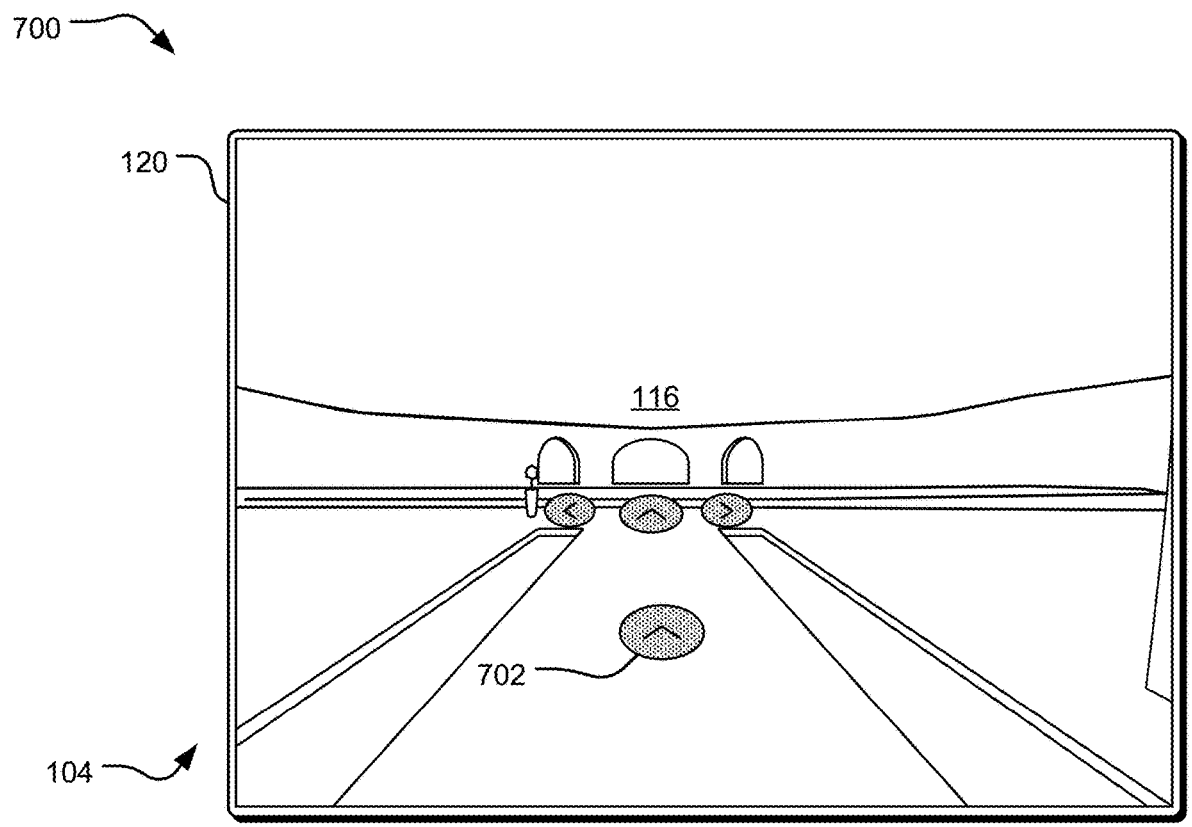
FIGS. 7A-7D illustrate an example system for generating a virtual interactive environment using navigation indicators and/or product information prompts, which can form at least a portion of the system of FIG. 1.
Figure 7B:
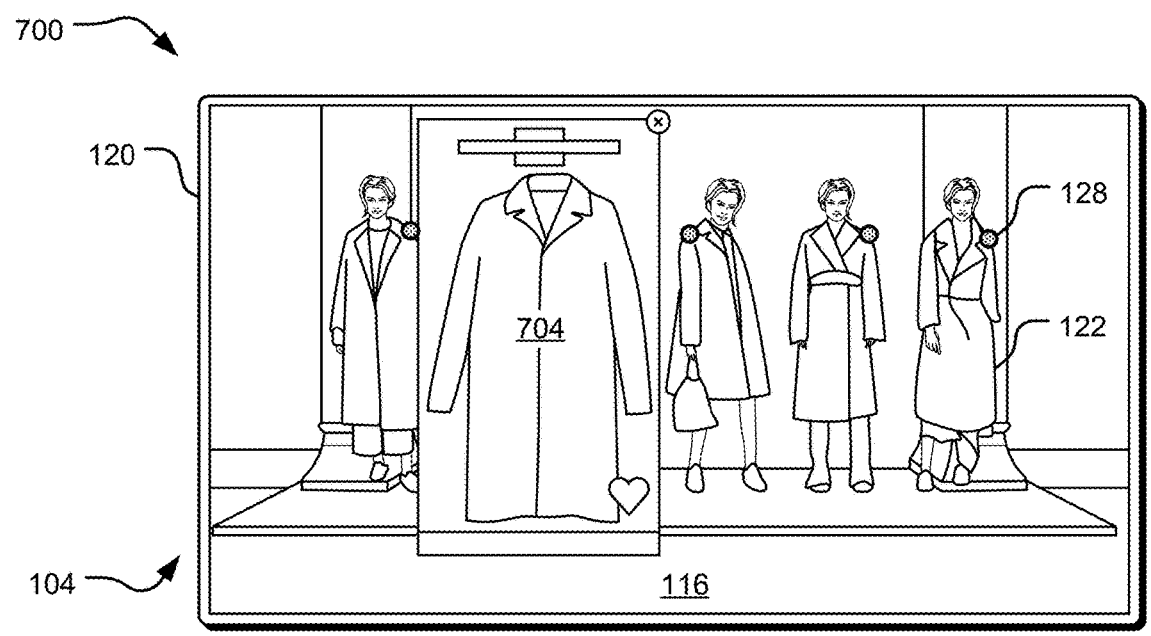
Figure 7C:
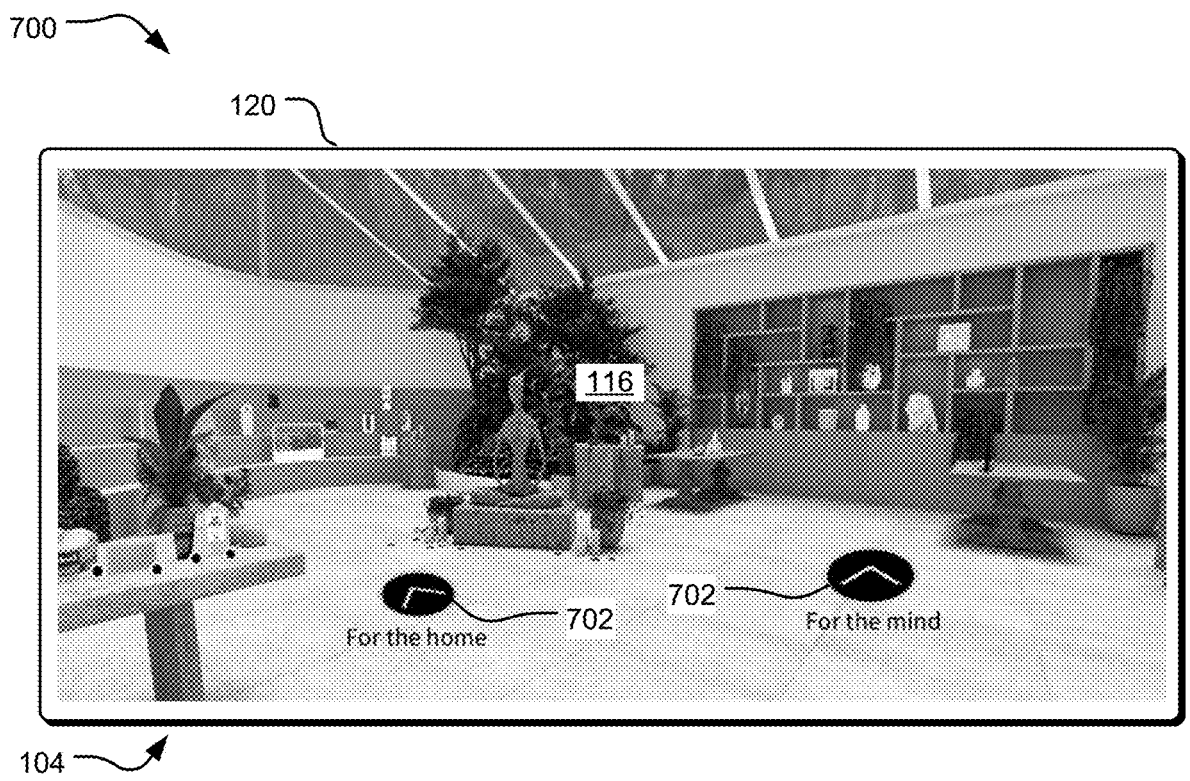
Figure 7D:
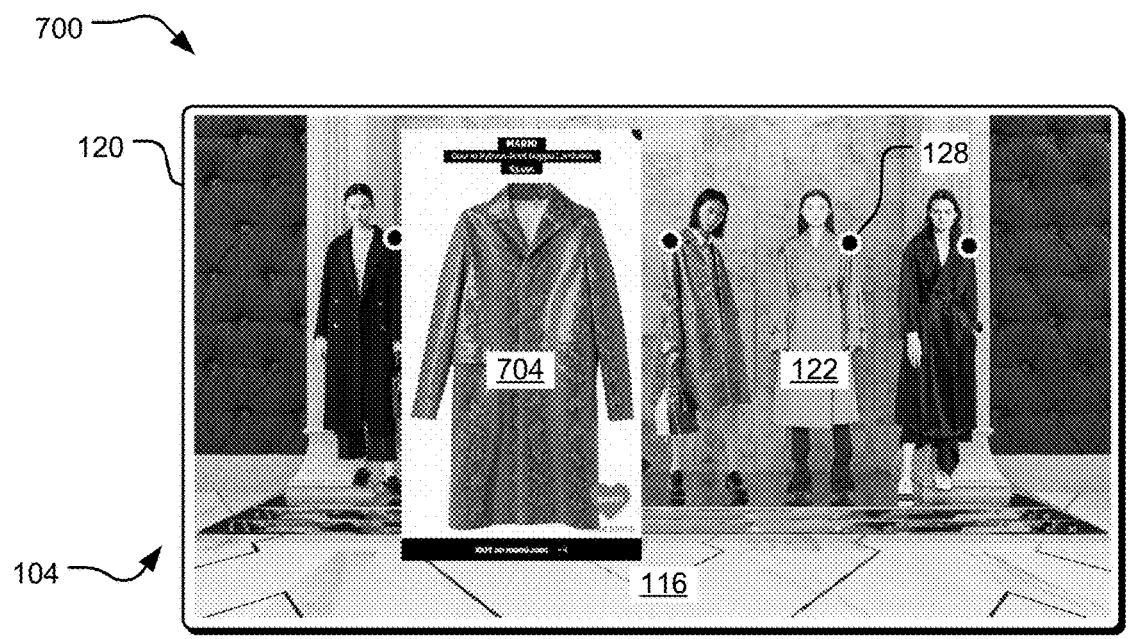

FIGS. 7A-7D illustrate an example system 700 to provide the virtual interactive environment 104 with the virtual environment generator 102. The system 700 can include one or more navigation indicators 702 for transitioning between viewpoints 112 and corresponding cube maps 110. Additionally, the system 700 can generate and/or present one or more product information prompts 704. The system 700 can form at least a portion of the system 100 depicted in FIG. 1. FIGS. 7C and 7D depict how the system 700 may be presented, for instance, at the guest systems 204 and/or the guest UI 214.

In some examples, the system 700 presents the virtual interactive environment 104 with navigation indicators 702 or other interactive items that, upon receiving a user input (e.g., a selection, a hover, an utterance, a gaze, a touch, or the like), change which cube map 110 from which viewpoint 112 is presented. For instance, the one or more navigation indicators 702 can cause a perspective of a guest user to move between the different viewpoints 112 along an incremented path. The virtual environment generator 102 can present the virtual interactive environment 104 as a sequence of cube maps 110 from the viewpoints 112 to which the user navigates with the one or more navigation indicators 702. Furthermore, some of the navigation indicators 702 can transition the guest user to a specialized viewpoint 112 or room that can be spatially separate from the incremental path (e.g., to create a teleporting effect), such as a viewpoint 112 corresponding to a featured product model 122 (e.g., new, on sale, seasonal, etc.). In some examples, a product model 122 selectable from one viewpoint may be visible from another viewpoint (e.g., through a window, door, or opening in the wall) to entice a user to select the one or more navigation indicators 702 and go to the product model 122. This and other techniques discussed herein provide a realistic virtual shopping experience that is more engaging than merely scrolling icons.

In some examples, the system 700 can generate and present a suggested viewpoint which can correspond to a preference of the user. The virtual environment generator 102 can determine the preference a variety of ways, such as by presenting a prompt asking the user a question and receiving an answer (e.g., preferred color, season, song, designer, etc.). Moreover, the purchase history 216, the one or more friend associations 220, and various other user inputs 222, such as hovering or viewing time at other related product models 122, can be used to determine the preference and/or a corresponding suggested viewpoint. In some instances, multiple scenes of rooms of the virtual interactive environment 104 can be stored in the one or more databases 224 and product models 122 can be dynamically populated on a personalized basis for the user. Additionally, various aspects of the rooms and scenes discussed herein can also be customized and/or automatically generated based on user preferences (e.g., the animation layers 124, the virtual character 404 or other virtual items, and the like). Moreover, scenes can be generated representing other environments outside of a retail store, such as a spa, a beach, a home (e.g., during the holidays), outer space, and the like. Scenes representing a real-world or non-retail environment can present the product models 122 in their natural environments and/or in their use-case scenarios.

In some instances, the system 700 can include one or more interactive planes 128 which can be mapped to the mapping locator(s) 118 and/or associated with coordinates on the cube map 110. The one or more interactive planes 128 can be shapes, objects, items, and the like, which can be visible or fully transparent. For instance, the one or more interactive planes 128 can be a circle or icon partially overlapping or near a product model 122 to which the one or more interactive planes 128 are associated. Upon receiving a user input or interaction at the one or more interactive planes 128, the virtual environment generator 102 can determine a product identifier corresponding to the product model 122 and retrieve the product data 108 associated with the product model 122. A prompt (e.g., window) can be displayed presenting the product data 108 and/or an option to purchase the product represented by the product model 122. The interactive plane 128 can, in some instances, be transparent and at least partly layered over the product model 122 in addition or alternatively to being an icon or circle. In some examples, the boundary of the interactive plane 128 aligns with the product model 122. In some instances, the non-transparent interactive planes 128 (e.g., icons, circles, etc.) can change color, shape, or brightness in response to a user interaction. User inputs 222 at the one or more interactive planes 128 can cause the product data 108 to be retrieved via the API calls to the merchant system(s) 202 and/or the databases 224, which can store and update the product data 108 based on feed information (e.g., received and stored once a day). This can improve retrieval and presentation speed for the product data 108. Various combinations of different types of one or more interactive planes 128 described herein can be used (e.g., even at a single viewpoint 114).

Figure 8A:
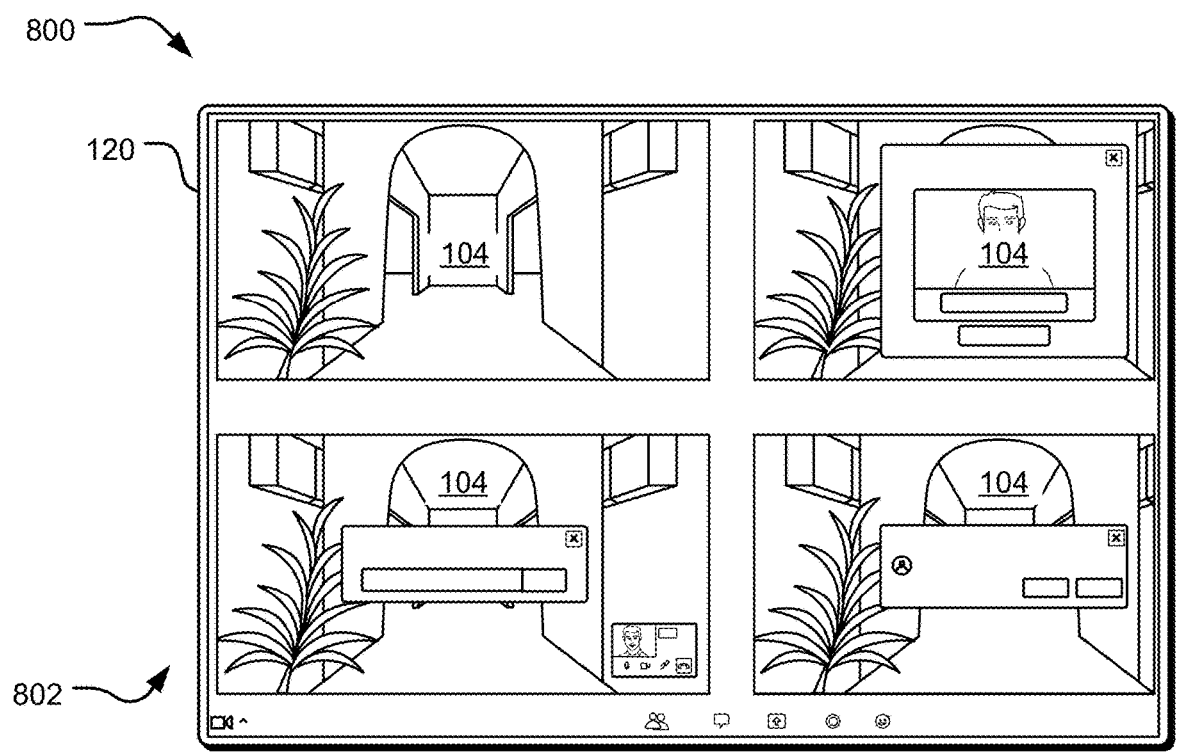
FIGS. 8A and 8B illustrate an example system for generating a virtual interactive environment having a friend service and/or a customizable portion, which can form at least a portion of the system of FIG. 1.
Figure 8B:
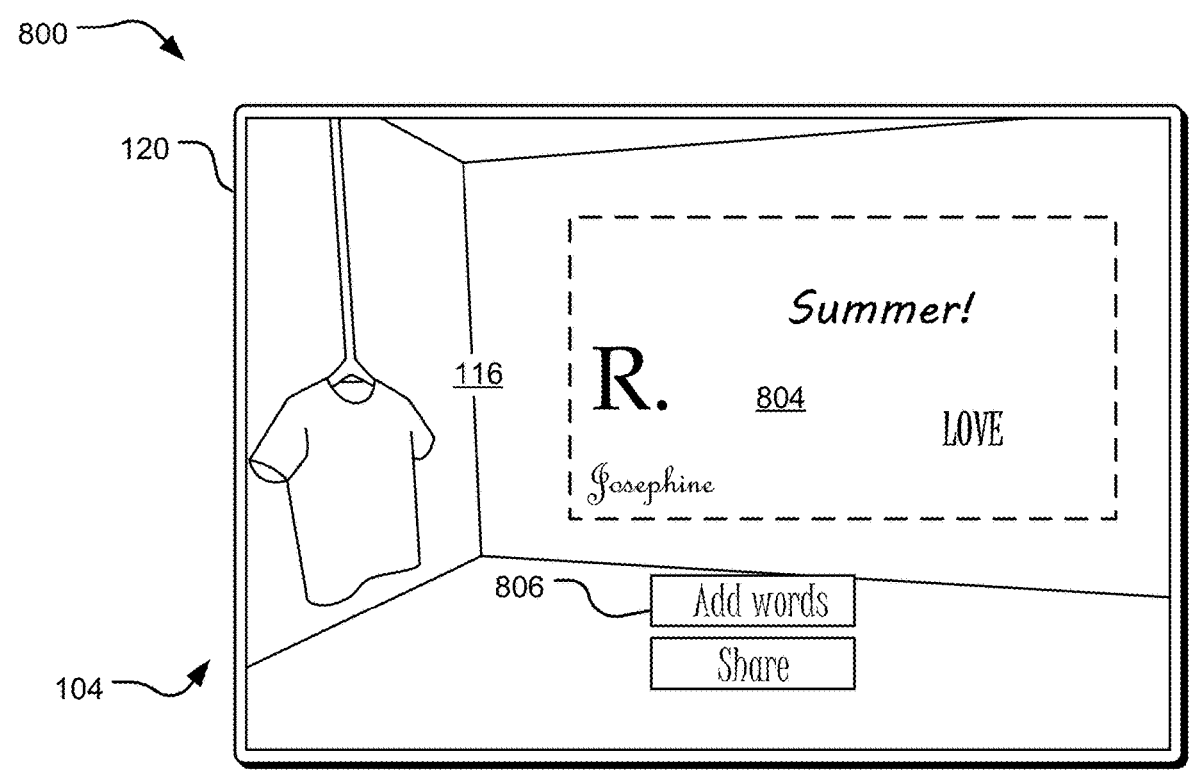

FIGS. 8A and 8B illustrate an example system 800 to provide the virtual interactive environment 104 with the virtual environment generator 102. The system 800 can include a friend service 802 and/or a user customizable portion 804 of the cube map 110. The system 800 can form at least a portion of the system 100 depicted in FIG. 1.

In some examples, the friend service 802 provides view sharing and/or live video streaming integrated into the virtual interactive environment 104. Multiple guest systems 204 corresponding to multiple users may simultaneously access the virtual interactive environment 104, which the virtual environment generator 102 can coordinate based on the one or more friend associations 220 stored at the one or more databases 224. For instance, upon creating the virtual interactive environment 104, the virtual environment generator 102 can receive a user input 222 requesting to add or allow a guest system 204 with the friend association 220 to join the session. For instance, a URL link can be generated corresponding to the session occurring at a primary device. The URL link can be sharable and anyone that receives the URL link can view the session occurring at the primary device (e.g., the viewpoints 112 being presented). The primary user can cause the URL link to be generated by selecting an interactive element (e.g., a "shop with friends" icon) and the URL link can connect any recipient that receives and clicks on the link to the same session the primary user is currently in and/or was in when the link was created.

The same link generation mechanism can be used for adding friends when the primary user is in a "follow" mode or a "multi-user" mode. For instance, additional friends or a plurality of viewers can enter a "follow" mode in which they can only watch the interface of the primary device as the primary user navigates and interacts with the virtual interactive environment 104. In "follow" mode, the viewing devices may be unable to perform their own navigation inputs and/or selection inputs. However, some inputs at the primary device can trigger actions at the plurality of viewing devices. For instance, the primary device user can select the product model 122 and/or put an item in the primary device user's shopping cart. In response, one or more transaction actions can be performed at the plurality of viewing devices, such as putting the same product item in a plurality of shopping carts associated with the plurality of viewing devices, recommending the product item at the plurality of viewing devices, executing the transaction for the plurality of viewing devices, and combinations thereof. Moreover, the plurality of viewing devices may be able to switch between the "follow" mode and a "multi-user" mode, in which the plurality of viewing devices can navigate through the virtual interactive environment 104 on their own (e.g., for their own shopping experience independent from the primary device), for example, by generating additional instances of the viewpoints 112 unique to the plurality of viewing devices.

Furthermore, while in "multi-user" mode, the multiple users can be represented in the virtual interactive environment 104 as avatars (e.g., based on user profile images), and/or a live video teleconference of the different can be layered over the virtual interactive environment 104 as the multiple users move to different viewpoints 112. In some examples, a user input 222 (e.g., hovering over a friend name or icon of another user in the virtual interactive environment 104) can cause the virtual environment generator 102 to present an indication of which viewpoint 112 the other users are currently being presented to the guest system 204 of that friend (e.g., a room name or a scene name). Once a user clicks or select while hovering over another user's icon, aviator, or name, that selecting user can be transported to the selected viewpoint (e.g., room) of their friend. The different users can view the virtual interactive environment 104 independently in "multi-user" mode. Moreover, a friend may share a scene from their viewpoint 112 and/or one user can be teleported to a scene or room of another user via many trigger types. The friend service 802 can have both the fully interactive "multi-user" mode where all users interact independently and the "follow" mode where the primary user navigates through the virtual interactive environment 104 and everyone else sees what is displayed at the guest system 204 of the primary user (e.g., shopping with influencers). The number of viewing devices can vary between a relatively small group (e.g., 2-5, 6, 8, 2-10 etc.), a medium group (e.g., 10-100,50-100, 10-1000, etc.), or a large group (e.g., 100+, 100-1000, 1000+, etc.), with other categorizations or group scales considered herein. Some of the interactive features may or may not be available depending on the size of the viewing device group. For instance, video conferencing, text chatting, avatars, and "multi-user" mode may only be available for small groups and/or medium groups, whereas "follow" mode, chatting, and/or triggering transaction actions may be available in large groups. Any combination of disclosed features can be arranged into the different group sizes (e.g., based on varying computational requirements). In some example, the different guest systems 204 can maintain their own sessions to support the plurality of viewing devices.

In some examples, the cube map 110 can include a customizable portion 804. The customizable portion 804 can include a designated area (e.g., defined by the mapping locator(s) 118), which can be changed by the guest systems 204 and/or the guest UI 214. This can give the user the ability to influence the design of the scene or room, which can be saved and viewed by other guest systems 204. In some examples, the user can place items on the customizable portion 804 which can be layered onto the cube map 110 such that the customizable portion 804 appears as a virtual wall in the virtual 3D space. A customize indicator 806 can alert users to the fact that the customizable portion 804 exists and can be customized (e.g., text such as "Add a Word" or "Choose a Color"). In some instances, a predetermined or preset selection of words, phrases, objects, and/or colors are available to be placed on the customizable portion 804 at a location chosen by the user. The customizable portion 804 can become a part of the virtual interactive environment 104 for other guest systems 204 to see. In some examples, the customizable portion 804 can provide an area where the user can leave a note for a friend, a comment about a product, and the like. Moreover, the virtual environment generator 102 can present a share button which, in response to a user input, generates an image of the customizable portion 804 and sends the image to a social media account associated with the guest system 204.

Figure 9:
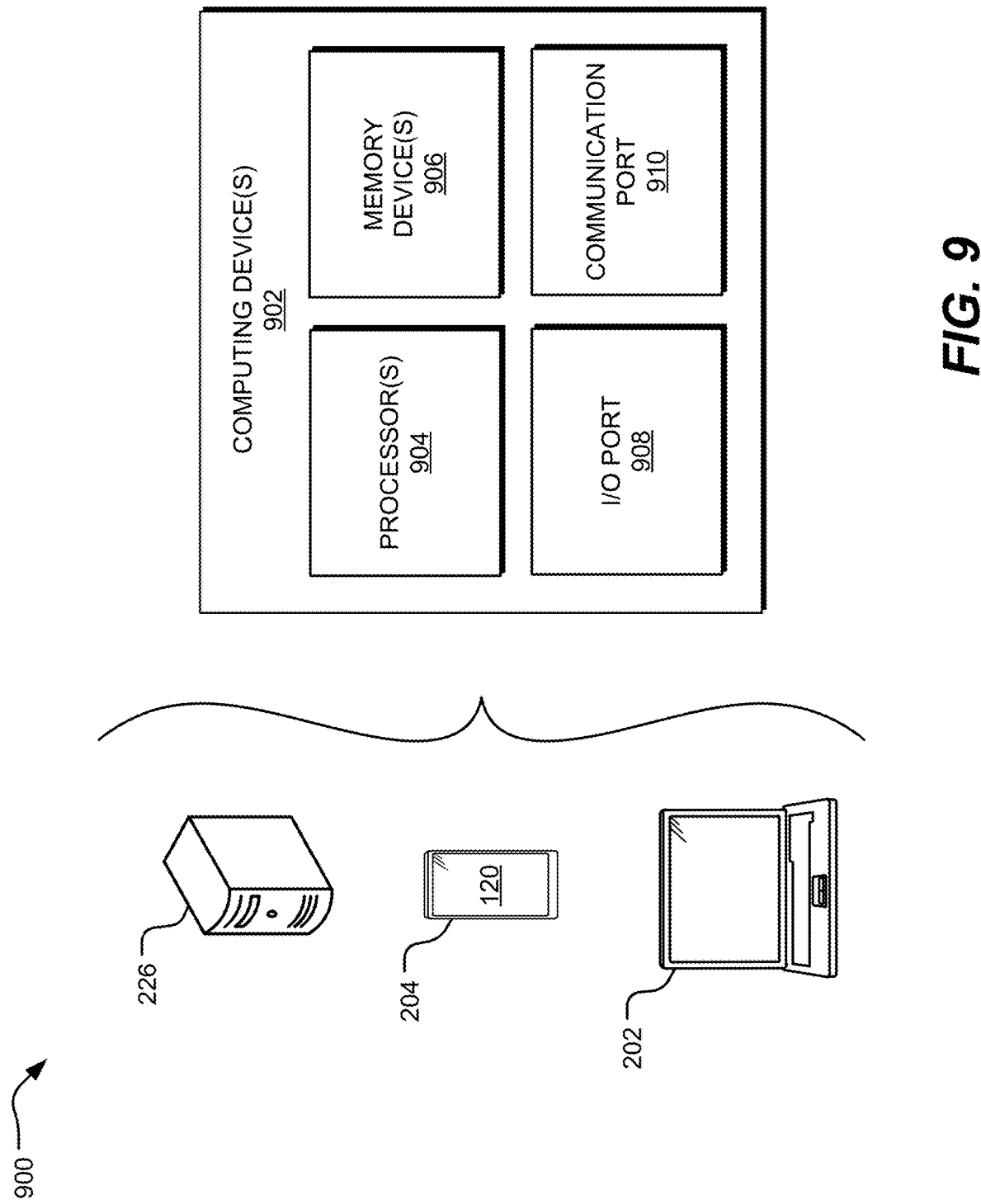
FIG. 9 illustrates an example system for generating a virtual interactive environment using one more computing systems, which can be used to implement at least a portion of the system of FIG. 1.

FIG. 9 illustrates an example system 900 to provide the virtual interactive environment 104 with the virtual environment generator 102. The system 900 can include one or more computer system(s) 902 which can implement the systems 100-800 discussed herein. In one implementation, the one or more computing device(s) 902 include the merchant systems 202, the guest systems 204 (e.g., the user device 120 rendering the guest UI 214), the server devices 226, the virtual environment creator systems, and/or any other devices forming or implementing the systems 100-800.

In some instances, the computing device(s) 902 includes a computer, a personal computer, a desktop computer, a laptop computer, a terminal, a workstation, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 902 may be integrated with, form a part of, or otherwise be associated with the systems 100-800. It will be appreciated that specific implementations of these devices may be of differing possible specific computing architectures not all of which are specifically discussed herein but will be understood by those of ordinary skill in the art.

The computing device 902 may be a computing system capable of executing a computer program product to execute a computer process. The virtual environment generator 102 can be stored and executed at the computing device 902 (e.g., as one or more software components). Data and program files may be input to the computing device 902 (e.g., the computer-generated 3D model 106, the product data 108, the user inputs 222, etc.), which reads the files and executes the programs therein to generate the virtual interactive environment 104. Some of the elements of the computing device 902 include one or more hardware processors 904, one or more memory devices 906, and/or one or more ports, such as input/output (IO) port(s) 908 and communication port(s) 910. Additionally, other elements that will be recognized by those skilled in the art may be included in the computing device 902 but are not explicitly depicted in FIG. 9 or discussed further herein. Various elements of the computing device 902 may communicate with one another by way of the communication port(s) 910 and/or one or more communication buses, point-to-point communication paths, or other communication means.

The processor 904 may include, for example, a central processing unit (CPU), a microprocessor, a microcontroller, a digital signal processor (DSP), and/or one or more internal levels of cache. There may be one or more processors 904, such that the processor 904 comprises a single central-processing unit, or a plurality of processing units capable of executing instructions and performing operations in parallel with each other, commonly referred to as a parallel processing environment.

The computing device 902 may be a conventional computer, a distributed computer, or any other type of computer, such as one or more external computers made available via a cloud computing architecture. The presently described technology is optionally implemented in software stored on the data storage device(s) such as the memory device(s) 906, and/or communicated via one or more of the ports 908 and 910, thereby transforming the computing device 902 in FIG. 9 to a special purpose machine for implementing the operations described herein.

The one or more memory device(s) 906 may include any non-volatile data storage device capable of storing data generated or employed within the computing device 902, such as computer executable instructions for performing a computer process, which may include instructions of both application programs and an operating system (OS) that manages the various components of the computing device 902. The memory device(s) 906 may include, without limitation, magnetic disk drives, optical disk drives, solid state drives (SSDs), flash drives, and the like. The memory device(s) 906 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 906 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 906 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 902 includes one or more ports, such as the I/O port 908 and the communication port 910, for communicating with other computing, network, or vehicle devices. It will be appreciated that the I/O port 908 and the communication port 910 may be combined or separate and that more or fewer ports may be included in the computing device 902.

The I/O port 908 may be connected to an I/O device, or other device, by which information is input to or output from the computing device 902. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 902 via the I/O port 908. Similarly, the output devices may convert electrical signals received from the computing device 902 via the I/O port 908 into signals that may be sensed as output by a human, such as sound, light, and/or touch. The input device may be an alphanumeric input device, including alphanumeric and other keys for communicating information and/or command selections to the processor 904 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing device 902 via the I/O port 908. For example, an electrical signal generated within the computing device 902 may be converted to another type of signal, and/or vice-versa. In one implementation, the environment transducer devices sense characteristics or aspects of an environment local to or remote from the computing device 902, such as, light, sound, temperature, physical movement, orientation, acceleration, gravity, and/or the like. Further, the environment transducer devices may generate signals to impose some effect on the environment either local to or remote from the example computing device 902, such as, physical movement of some object (e.g., a mechanical actuator) and/or the like.

In one implementation, the communication port 910 is connected to the network 206 and the computing device 902 may receive network data useful in executing the methods and systems set out herein as well as transmitting information and network configuration changes determined thereby. Stated differently, the communication port 910 connects the computing device 902 to one or more communication interface devices configured to transmit and/or receive information between the computing device 902 and other devices by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 910 to communicate one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 910 may communicate with an antenna or other link for electromagnetic signal transmission and/or reception.

In an example implementation, the virtual environment generator 102 may be embodied by instructions stored on the memory devices 906 and executed by the processor 904.

The system 900 set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 902.

Figure 10:
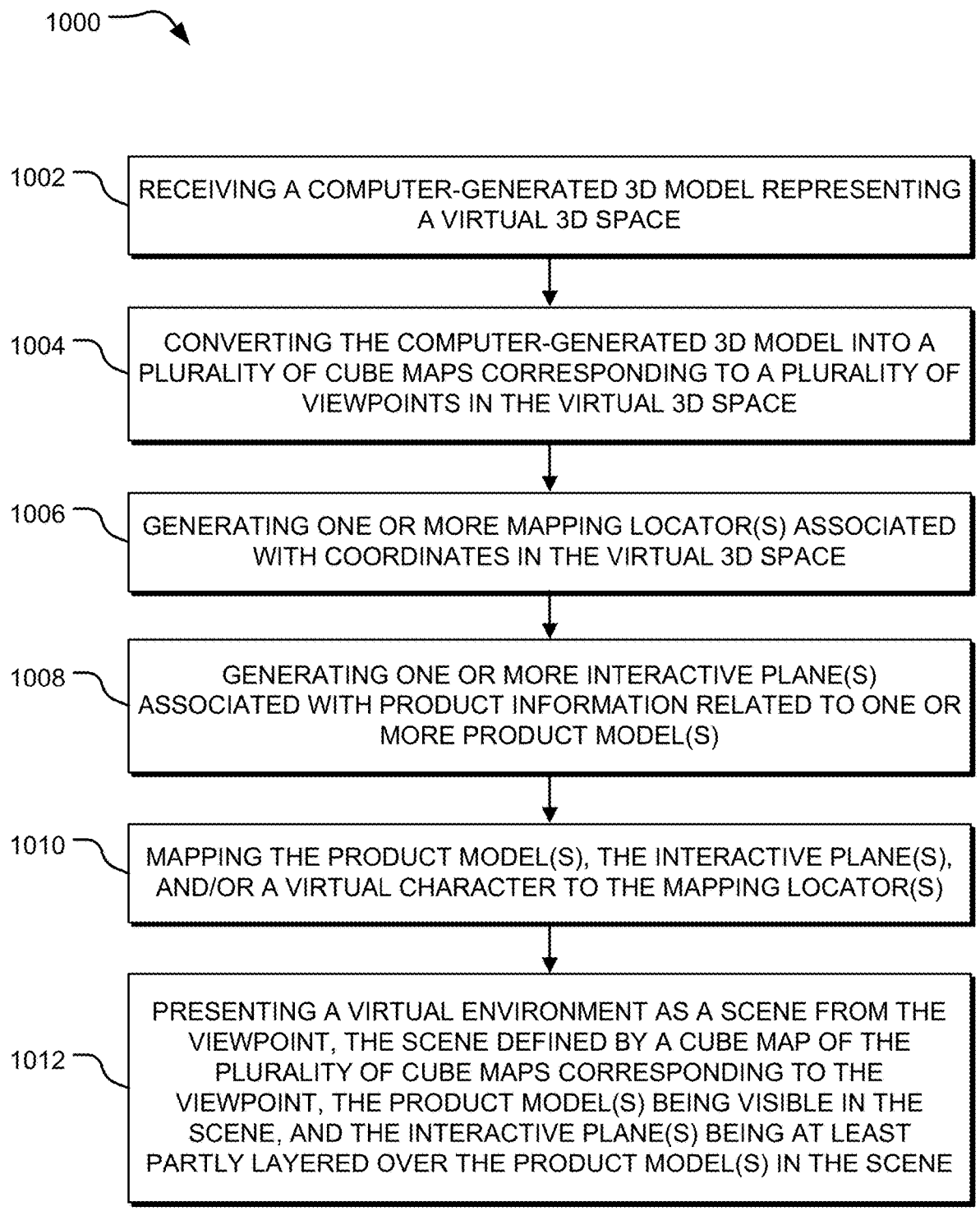
FIG. 10 illustrates an example method for generating a virtual interactive environment, which can be performed by the system of FIG. 1.

FIG. 10 illustrates an example method 1000 to provide the virtual interactive environment 104 using the virtual environment generator 102, which can be performed by any of the systems 100-900.

In some examples, at operation 1002, the method 1000 receives a computer-generated 3D model (or other data file) representing a virtual 3D space. At operation 1004, the method 1000 converts the computer-generated 3D model into a plurality of cube maps corresponding to a plurality of viewpoints in the virtual 3D space. At operation 1006, the method 1000 generates one or more mapping locator(s) associated with coordinates in the virtual 3D space. At operation 1008, the method 1000 generates one or more interactive plane(s) associated with product information related to one or more product model(s). At operation 1010, the method 1000 maps the product model(s), the interactive plane(s), and/or a virtual character to the mapping locator(s). At operation 1012, the method 1000 presents a virtual environment as a scene from the viewpoint, the scene defined by a cube map of the plurality of cube maps corresponding to the viewpoint, the product model(s) being visible in the scene, and the interactive plane(s) being at least partly layered over the product model(s) in the scene.

It is to be understood that the specific order or hierarchy of steps in the method 1000 depicted in FIG. 10 are instances of example approaches and can be rearranged while remaining within the disclosed subject matter. For instance, any of the operations depicted in FIG. 10 or throughout this disclosure may be omitted, repeated, performed in parallel, performed in a different order, and/or combined with any other of the operations depicted in FIG. 10 or throughout this disclosure.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method to provide a virtual interactive environment, the method comprising:
    receiving a computer-generated three-dimensional (3D) model representing a virtual 3D space;
    converting the computer-generated 3D model into a plurality of cube maps corresponding to a plurality of viewpoints in the virtual 3D space, the plurality of viewpoints creating an incremented path in the virtual 3D space;
    generating, at a viewpoint of the plurality of viewpoints, a mapping plane or a mapping point associated with coordinates in the virtual 3D space;
    mapping one or more product models to the mapping plane or the mapping point;
    generating an interactive plane for the one or more product models, the interactive plane being associated with product information related to the one or more product models such that an interaction with the interactive plane causes retrieval of the product information; and
    presenting, at a display, the virtual interactive environment as a scene from the viewpoint, the scene being defined by a cube map of the plurality of cube maps corresponding to the viewpoint, the one or more product models being visible in the scene, and the interactive plane being at least partly layered over the one or more product models in the scene, the cube map including a plurality of (2D) cube side images, wherein presenting the virtual interactive environment includes rendering a front 2D cube side image of the plurality of 2D cube side images before rendering other 2D cube side images of the plurality of 2D cube side images.

2. The method of claim 1, wherein the scene is a first scene and the viewpoint is a first viewpoint, and further comprising presenting, at the display, one or more navigation arrows which, upon receiving a user input, cause the display to present a second scene by traversing from the first viewpoint to a second viewpoint of the plurality of viewpoints.

3. The method of claim 1, wherein the one or more product models include a 2D video with a skew corresponding to the mapping plane.

4. The method of claim 1, wherein the viewpoint is a first viewpoint and further comprising:
    receiving a first user input as a response to a prompt for preference information;
    receiving a second user input as the interaction with the interactive plane; and
    determining a second viewpoint to present at the display as a suggested viewpoint based on the response or the product information associated with the interactive plane.

5. The method of claim 4, wherein:
    the computer-generated 3D model includes a virtual building;
    the virtual 3D space is an inside of the virtual building,
    the plurality of viewpoints include a plurality of rooms inside the virtual building; and
    the second viewpoint corresponds to a particular room of the plurality of rooms with an associated trait corresponding to the response or the product information.

6. The method of claim 1, wherein the one or more product models include a first product image based on a 3D model file and a second product image based on a 2D image file.

7. The method of claim 1, wherein coordinates of the viewpoint are based at least partly on a minimum distance value from a surface in the virtual 3D space.

8. The method of claim 1, wherein generating the mapping plane includes defining a plurality of corner points for the mapping plane at a virtual surface in the virtual 3D space.

9. The method of claim 1, further comprising:
    mapping an animation layer to the mapping plane or the mapping point, the animation layer including a repeating color event.

10. The method of claim 1, wherein the display is a first display of a first computing device, the scene is a first scene defined by a first cube map of the plurality of cube maps, and further comprising:
    presenting the virtual interactive environment at a second display of a second computing device;
    receiving a navigation input at the first computing device; and
    presenting, in response to the navigation input at the first computing device, at the first computing device and at the second computing device, the virtual interactive environment as a second scene defined by a second cube map of the plurality of cube maps.

11. A method to provide a virtual interactive environment, the method comprising:
    receiving a computer-generated three-dimensional (3D) model representing a virtual 3D space;
    converting the computer-generated 3D model into a plurality of cube maps corresponding to a plurality of viewpoints in the virtual 3D space, the plurality of viewpoints creating an incremented path in the virtual 3D space;
    generating, at a viewpoint of the plurality of viewpoints, a plurality of mapping locators, the plurality of mapping locators including a 3D mapping shape placed in the virtual 3D space, the 3D mapping shape including a 3D mapping box, wherein generating the plurality of mapping locators includes defining at least one of boundaries or corners of the 3D mapping box;

mapping a product model to a first mapping locator of the plurality of mapping locators;

mapping an animation layer to a second mapping locator of the plurality of mapping locators; and presenting, at a display, the virtual interactive environment as a scene from the viewpoint, the scene being defined by a cube map of the plurality of cube maps, the product model being visible in the scene, and the animation layer causing a repeating color event in the scene.

12. The method of claim 11, wherein the second mapping locator is a mapping plane or one or more mapping points and the animation layer includes the repeating color event over a portion of the cube map defined by the mapping plane or the one or more mapping points.

13. The method of claim 12, wherein the animation layer includes a water animation and the repeating color event includes a lighting effect across at least a portion of the mapping plane.

14. The method of claim 12, wherein the animation layer includes a twinkle animation and the repeating color event includes a changing brightness at coordinates of the one or more mapping points.

* * * * *